(12) United States Patent
Nakao et al.

(10) Patent No.: US 12,230,033 B2
(45) Date of Patent: Feb. 18, 2025

(54) MONITORING DEVICE, MONITORING METHOD, AND PROGRAM RECORDING MEDIUM

(71) Applicant: NEC Corporation, Tokyo (JP)

(72) Inventors: Tomoaki Nakao, Tokyo (JP); Kenji Yamamoto, Tokyo (JP); Takehiko Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 17/790,373

(22) PCT Filed: Feb. 26, 2021

(86) PCT No.: PCT/JP2021/007472
§ 371 (c)(1),
(2) Date: Jun. 30, 2022

(87) PCT Pub. No.: WO2021/177183
PCT Pub. Date: Sep. 10, 2021

(65) Prior Publication Data
US 2023/0041612 A1     Feb. 9, 2023

(30) Foreign Application Priority Data
Mar. 5, 2020    (JP) ................................ 2020-037532

(51) Int. Cl.
*G06V 20/52*     (2022.01)
*G06Q 50/08*     (2012.01)
(Continued)

(52) U.S. Cl.
CPC ............. *G06V 20/52* (2022.01); *G06Q 50/08* (2013.01); *G06V 20/44* (2022.01); *G06V 40/103* (2022.01); *G06V 40/20* (2022.01); *G08B 21/02* (2013.01)

(58) Field of Classification Search
None
See application file for complete search history.

(56) References Cited

U.S. PATENT DOCUMENTS 10,507,793 B1 * 12/2019 De Moura Partika ...................... G08B 13/19613
11,119,216 B1 * 9/2021 Ebrahimi Afrouzi ...................... G05D 1/0274
(Continued)

FOREIGN PATENT DOCUMENTS

| CN | 109558783 A | 4/2019 |
| CN | 111080963 A | 4/2020 |

(Continued)

OTHER PUBLICATIONS

JP Office Action for JP Application No. 2022-505187, mailed on Aug. 22, 2023 with English Translation.
(Continued)

*Primary Examiner* — Mohammad J Rahman

(57) ABSTRACT

A monitoring device is configured to include an image data acquiring unit, a detecting unit, and a notifying unit. The image data acquiring unit acquires image data obtained by imaging a work area, and information relating to the position in which the image data were captured. The detecting unit detects, from the image data, at least either an unsafe behavior of a worker in the work area, or an unsafe environment around the worker, as an unsafe condition. The notifying unit notifies a terminal of the unsafe condition detected by the detecting unit, and the information relating to the position in which the unsafe condition is detected.

8 Claims, 28 Drawing Sheets

(51) Int. Cl.
*G06V 20/40* (2022.01)
*G06V 40/10* (2022.01)
*G06V 40/20* (2022.01)
*G08B 21/02* (2006.01)

(56) References Cited

U.S. PATENT DOCUMENTS

| | | | |
|---|---|---|---|
| 11,267,153 B2* | 3/2022 | Rivers | G05B 19/19 |
| 2012/0146789 A1 | 6/2012 | De Luca et al. | |
| 2013/0282609 A1* | 10/2013 | Au | G06Q 50/265 705/325 |
| 2016/0200462 A1* | 7/2016 | Kriheli | G06Q 10/06316 700/214 |
| 2017/0142335 A1* | 5/2017 | Matsumoto | H04N 23/80 |
| 2017/0248441 A1* | 8/2017 | Heimrath | G01C 21/3667 |
| 2017/0330160 A1* | 11/2017 | Sueyoshi | G06Q 40/08 |
| 2017/0355079 A1* | 12/2017 | Takahashi | B25J 9/1676 |
| 2018/0089524 A1* | 3/2018 | Takahashi | G06V 10/255 |
| 2018/0196438 A1* | 7/2018 | Newlin | G01C 21/3852 |
| 2018/0346294 A1* | 12/2018 | Shely | B66C 23/905 |
| 2018/0349654 A1* | 12/2018 | Takeshima | G05B 19/4061 |
| 2019/0197887 A1* | 6/2019 | Modi | H04B 10/548 |
| 2019/0213429 A1* | 7/2019 | Sicconi | G06F 3/012 |
| 2019/0253670 A1* | 8/2019 | Chien | F21S 4/28 |
| 2019/0385430 A1 | 12/2019 | Criado-Perez et al. | |
| 2020/0397509 A1* | 12/2020 | Chen | G16H 30/40 |
| 2021/0229629 A1* | 7/2021 | Ghannam | B60N 2/002 |
| 2022/0075996 A1* | 3/2022 | Jian | G06Q 20/40145 |

FOREIGN PATENT DOCUMENTS

| | | |
|---|---|---|
| JP | 2011-165120 A | 8/2011 |
| JP | 2018-019278 A | 2/2018 |
| JP | 2018-173957 A | 11/2018 |
| JP | 2018-202531 A | 12/2018 |
| JP | 6644327 B1 | 2/2020 |

OTHER PUBLICATIONS

International Search Report for PCT Application No. PCT/JP2021/007472, mailed on May 18, 2021.
English translation of Written opinion for PCT Application No. PCT/JP2021/007472, mailed on May 18, 2021.

* cited by examiner

Fig.7

JANUARY 2020
UNSAFE BEHAVIOR
THE NUMBER OF OCCURRENCES   11 CASES

ONE-PERSON WORK      8 CASES

WORK AREA A  WORK A      5 CASES
　WORK AREA B  WORK B      1 CASE
　WORK AREA C  WORK C      2 CASES
　WORK AREA D  WORK D      0 CASES

ENTRY INTO ENTRY PROHIBITED AREA
                    3 CASES

WORK AREA A  WORK A      2 CASES
　WORK AREA B  WORK B      0 CASES
　WORK AREA C  WORK C      0 CASES
　WORK AREA D  WORK D      1 CASE

STEPLADDER UNSAFE WORK   0 CASES

JANUARY 2020

ONE-PERSON WORK HISTORY DATA
WORK AREA A
THE NUMBER OF OCCURRENCES 5 CASES

1. JANUARY 8, 2020  21:25   IMAGE
2. JANUARY 9, 2020  20:53   IMAGE
3. JANUARY 15, 2020  14:07  IMAGE
4. JANUARY 21, 2020  21:18  IMAGE
5. JANUARY 23, 2020  19:41  IMAGE

Fig.24

JANUARY 2020
UNSAFE WORK
THE NUMBER OF OCCURRENCES  11 CASES

ONE-PERSON WORK    8 CASES

WORK AREA A  WORK A    5 CASES
WORK AREA B  WORK B    1 CASE
WORK AREA C  WORK C    2 CASES
WORK AREA D  WORK D    0 CASES

ENTRY INTO ENTRY PROHIBITED AREA
                     3 CASES

WORK AREA A  WORK A    2 CASES
WORK AREA B  WORK B    0 CASES
WORK AREA C  WORK C    0 CASES
WORK AREA D  WORK D    1 CASE

STEPLADDER UNSAFE WORK    0 CASES

JANUARY 2020

ONE-PERSON WORK HISTORY DATA
WORK AREA A  THE NUMBER OF OCCURRENCES 5 CASES

WORKER C  3 CASES
WORKER A  1 CASE
WORKER D  1 CASE

DETAILED HISTORY

1. JANUARY 8, 2020 21:25  WORKER C    IMAGE

2. JANUARY 9, 2020 20:53  WORKER C    IMAGE

3. JANUARY 15, 2020 14:07  WORKER A   IMAGE

4. JANUARY 21, 2020 21:18  WORKER C   IMAGE

5. JANUARY 23, 2020 19:41  WORKER D   IMAGE

MONITORING DEVICE, MONITORING METHOD, AND PROGRAM RECORDING MEDIUM

This application is a National Stage Entry of PCT/JP2021/007472 filed on Feb. 26, 2021, which claims priority from Japanese Patent Application 2020-037532 filed on Mar. 5, 2020, the contents of all of which are incorporated herein by reference, in their entirety.

TECHNICAL FIELD

The present invention relates to worker safety management, and particularly relates to a monitoring technique using image data.

BACKGROUND ART

In an environment such as a construction site where many workers perform various types of work for each process, safety monitoring of work is highly important. However, it is difficult to continuously grasp the behavior of each worker by visual monitoring by the supervisor. Therefore, a technique for performing safety monitoring based on image data captured in a work area has been developed. As such a technology for performing safety monitoring based on image data, for example, a technology such as PTL 1 is disclosed.

PTL 1 relates to a safety management system that manages behaviors of workers. The safety management system of PTL 1 determines whether work at a high place by a worker is appropriately performed according to a work procedure manual by analyzing an image obtained by imaging a reference object and a hand by a camera worn by the worker. The safety management system of PTL 1 notifies the worker and the administrator that an unsafe behavior is performed when it is determined that work is not performed in a correct procedure. PTL 2 discloses an analysis system that estimates an occurrence factor of an accident.

CITATION LIST

Patent Literature

[PTL 1] JP 2018-173957 A
[PTL 2] JP 2011-165120 A

SUMMARY OF INVENTION

Technical Problem

However, the technique of PTL 1 is not sufficient in the following points. The safety management system of PTL 1 determines whether the work is performed according to the work procedure manual based on the overlap between the reference object and the hand of the worker. However, in PTL 1, since the administrator cannot grasp the position of the worker, it is not possible to grasp at which position the worker exists in a wide construction site or the like and an unsafe behavior is performed. Therefore, in the technique of PTL 1, the administrator cannot obtain appropriate information relating to the position and state of the worker, and there is a possibility that the administrator cannot sufficiently take safety measures for the worker according to the work situation and the surrounding environment. The technique of PTL 2 estimates the cause of occurrence of past accidents, but cannot cope with the current state.

In order to solve the above problems, an object of the present invention is to provide a monitoring device or the like capable of making notification of appropriate information necessary for safety management of a worker.

Solution to Problem

In order to solve the above problem, a monitoring device of the present invention includes an image data acquiring unit, a detecting unit, and a notifying unit. The image data acquiring unit acquires image data obtained by imaging a work area, and information relating to the position at which the image data is captured. The detecting unit detects, from the image data, at least either an unsafe behavior of a worker in the work area, or an unsafe environment around the worker, as an unsafe condition. Specifically, the unsafe behavior of the worker refers to a behavior having a high risk of occurrence of an accident, such as one-person work by a worker. The unsafe environment around the worker refers to an environment in which an accident may occur, such as a state in which the workers work densely. The notifying unit notifies a terminal of the unsafe condition detected by the detecting unit, and the information relating to the position at which the unsafe condition is detected.

A monitoring system of the present invention includes an imaging device that captures an image of a work area and the above-described monitoring device. The image data acquiring means of the monitoring device acquires image data of the work area captured by the imaging device.

A monitoring method of the present invention includes acquiring image data obtained by imaging a work area and information relating to a position at which the image data is captured, detecting, from the image data, at least one of an unsafe behavior of a worker in the work area and an unsafe environment around the worker as an unsafe condition, and notifying a terminal of information relating to the detected unsafe condition and the information relating to a position at which the unsafe condition is detected.

The program recording medium of the present invention records a monitoring program. A monitoring program causes a computer to execute processing of acquiring image data obtained by imaging a work area and information relating to a position at which the image data is captured, processing of detecting, from the image data, at least one of an unsafe behavior of a worker in the work area and an unsafe environment around the worker as an unsafe condition, and processing of notifying a terminal of information relating the detected unsafe condition and information relating to a position at which the unsafe condition is detected.

Advantageous Effects of Invention

According to the present invention, it is possible to notify appropriate information necessary for safety management of a worker.

BRIEF DESCRIPTION OF DRAWINGS

FIG. 7 is a diagram illustrating an example of a report generated by the monitoring device according to the first example embodiment of the present invention.

FIG. 8 is a diagram illustrating an example of a report generated by the monitoring device according to the first example embodiment of the present invention.

FIG. 24 is a diagram illustrating an example of a report generated by the monitoring device according to the second example embodiment of the present invention.

FIG. 25 is a diagram illustrating an example of a report generated by the monitoring device according to the second example embodiment of the present invention.

EXAMPLE EMBODIMENT

First Example Embodiment

Figure 1:
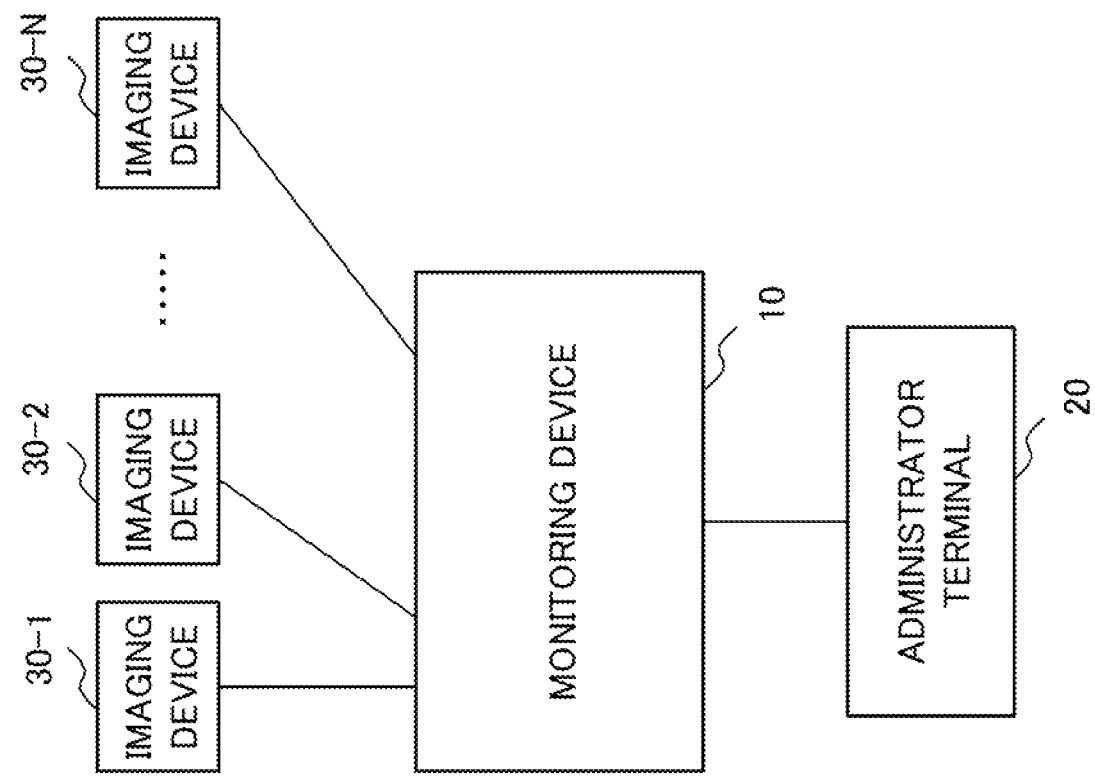
FIG. 1 is a diagram illustrating an example of a configuration of a monitoring system according to a first example embodiment of the present invention.

A first example embodiment of the present invention will be described in detail with reference to the drawings. FIG. 1 is a diagram illustrating a configuration of a monitoring system of the present example embodiment. The monitoring system of the present example embodiment includes a monitoring device 10, an administrator terminal 20, and an imaging device 30. N imaging devices 30 of the imaging device 30-1 to the imaging device 30-N are provided. Only one imaging device 30 may be provided.

The monitoring system of the present example embodiment is a system that monitors work safety at a construction site based on image data.

Figure 2:
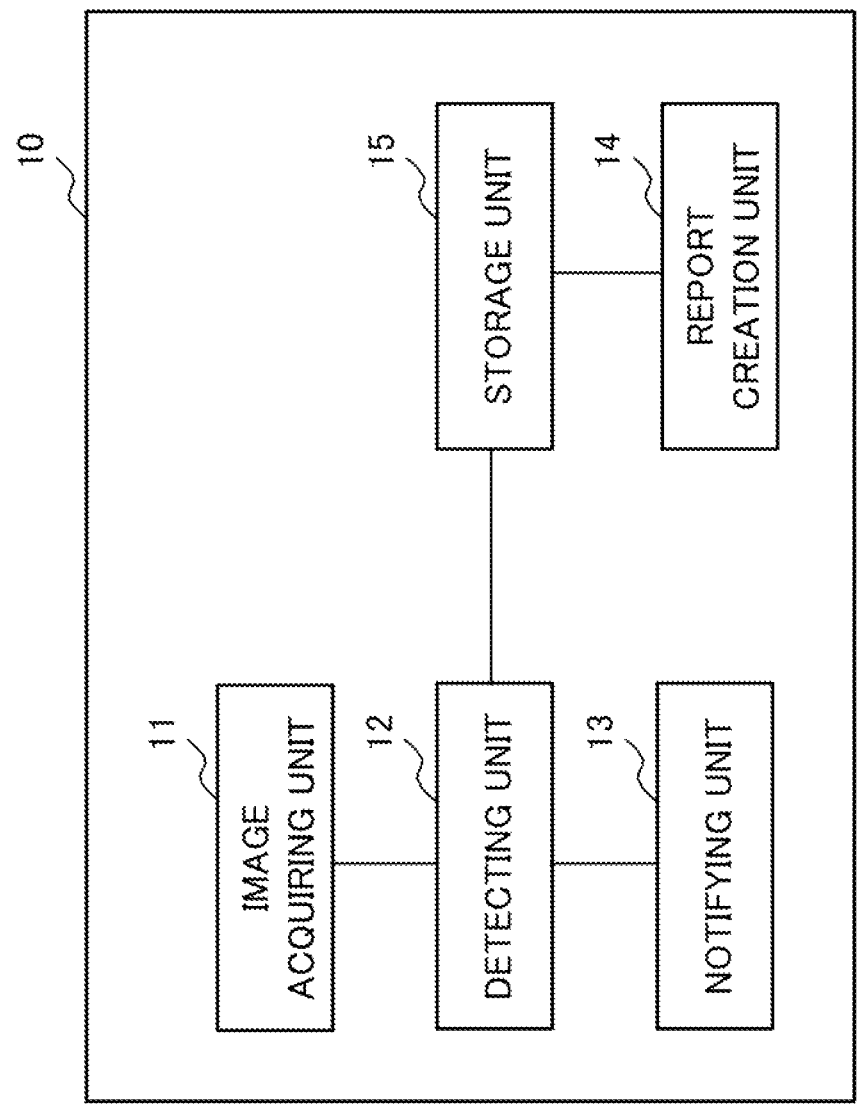
FIG. 2 is a diagram illustrating a configuration of a monitoring device according to the first example embodiment of the present invention.

A configuration of the monitoring device 10 will be described. FIG. 2 is a diagram illustrating a configuration of the monitoring device 10 according to the present example embodiment. The monitoring device 10 includes an image data acquiring unit 11, a detecting unit 12, a notifying unit 13, a report generating unit 14, and a storage unit 15.

The image data acquiring unit 11 acquires from the imaging device 30 the image data, the date and time when the image data is captured, and information relating to the position where the image data is captured.

The detecting unit 12 analyzes the image data and detects an unsafe condition of the worker. The unsafe condition refers to a state in which the worker may be in danger. The unsafe condition includes an unsafe behavior of the worker or an unsafe environment around the worker.

The unsafe behavior refers to, for example, one-person work by a worker, approach to a construction machine, entry to an entry prohibited area, work in an unstable situation at a stepladder, or non-use of a safety belt. The unsafe surrounding environment refers to, for example, a situation where the surroundings of the worker are dangerous, a situation where the probability of occurrence of an accident is high, or a situation where there is an opening on the floor.

In order to detect the unsafe condition, the reference data is set for each behavior of the worker or each surrounding environment. The detecting unit 12 detects the motion of the worker from the image data, and identifies the unsafe condition by comparing the feature of the detected motion with the reference data set for each unsafe condition.

When the behavior or the environment that is the unsafe condition is identified, the detecting unit 12 transmits to the notifying unit 13 information indicating the identified behavior or environment, image data at the time of detection, position information about the worker or the like who is the detection target of the unsafe condition, and information about the detection date and time as the detection result. The position information may include height information. The detecting unit 12 calculates the position information about the worker or the like by triangulation based on the position information about the imaging device 30, the information about the imaging azimuth, and the information about the reference point in the image, which are added to the image data and input from the imaging device 30. The position information about the worker or the like who is the detection target of the unsafe condition may be set using the name of the work area or the process name. When calculating the position of the worker who performed the unsafe behavior or the position of the surrounding environment, the detecting unit 12 may calculate the position of the worker or the like in the height direction and the height of the installation object or the construction machine in the work area.

The notifying unit 13 transmits the detection result by the detecting unit 12 of the unsafe condition to the administrator terminal 20. The notifying unit 13 transmits to the administrator terminal 20 the information relating to the unsafe condition, the image data when the unsafe condition is detected, the position information relating to the worker or the like who is the detection target of the unsafe condition, and the information relating to the detection date and time.

The report generating unit 14 generates statistical data of the detection result of the unsafe condition and generates a report for output based on the statistical data. The report generating unit 14 transmits the generated report to the administrator terminal 20.

Each processing in the image data acquiring unit 11, the detecting unit 12, the notifying unit 13, and the report generating unit 14 is performed, for example, by a central processing unit (CPU) executing a computer program. The image data acquiring unit 11, the detecting unit 12, the notifying unit 13, and the report generating unit 14 may be formed using a semiconductor device such as a field programmable gate array (FPGA).

The storage unit 15 stores information relating to the unsafe condition detected by the detecting unit 12, an occurrence place, an occurrence date and time, and image data when the unsafe condition is detected. The storage unit 15 is formed using, for example, a nonvolatile semiconductor storage device. The storage unit 15 may be formed by a storage device such as a hard disk drive or a combination of a plurality of types of storage devices.

The administrator terminal 20 acquires the detection result and the report of the unsafe condition from the monitoring device 10. The administrator terminal 20 displays the acquired detection result and report of the unsafe condition on the display device. The administrator terminal 20 may request the detection result and the report of the unsafe condition from the monitoring device 10 and acquire the detection result and the report of the unsafe condition as a response to the request. The administrator terminal 20 may transmit monitoring conditions such as a place and time to be monitored to the monitoring device 10.

The imaging device 30 is a movable device having an imaging function and a communication function. The imaging device 30 is disposed at a position where image data of the work area to be monitored can be acquired. Two reference points are installed together with the imaging device 30. The two reference points are disposed at positions where imaging can be performed from the imaging device 30. Information relating to the positions and heights of the two reference points is input to the monitoring device 10 in advance. The two reference points are used to identify the position of the worker or the like from the image data. The two reference points may include characteristic positions in the work area such as a corner portion that can be identified by image analysis. A plurality of imaging devices 30 may be installed in one work area, or a single imaging device may be installed. In a case where a plurality of imaging devices 30 is installed in one work area, the imaging devices 30 may be installed in such a way as to set other imaging devices as reference points. In a case where another imaging device 30 is installed as the reference point, the position information acquired by each imaging device 30 can be used as the position information about the reference point.

The imaging device 30 transmits image data, imaging position information, imaging azimuth information, and imaging date and time information to the monitoring device 10 via the network. The imaging device 30 transmits information relating to the height of the imaging device 30 from the ground contact surface to the monitoring device 10. The height from the ground contact surface of the imaging device 30 is calculated by correcting the height obtained from the GNSS using the geoid height. A measurement result may be used as the height of the imaging device 30 from the ground contact surface. The information relating to the height of the imaging device 30 from the ground contact surface using the measurement result may be input to the imaging device 30 by a worker, for example. Information relating to the height of the imaging device 30 from the ground contact surface may be directly input to the monitoring device 10 by a worker. The imaging device 30 may transmit the information about the imaging position, the information about the imaging azimuth, and the information about the height from the ground contact surface only when the imaging position and the imaging azimuth are changed such as the time of the start of operation, the time of movement, or the like. The imaging device 30 may directly perform radio communication with the monitoring device 10.

The imaging device 30 includes, for example, a camera capable of capturing an image in a visible region. The imaging device 30 may include a camera that captures an image in the infrared region, or a camera that captures an image in the visible region and in the infrared region. The camera and the communication unit of the imaging device 30 may be formed as an integrated module, or the camera and the communication unit may be formed as separate modules and connected to each other. The imaging device 30 may include a smartphone or a tablet terminal device having an imaging function and a communication function.

The imaging device 30 acquires the position information using, for example, a global navigation satellite system (GNSS). The imaging device 30 detects an azimuth in a direction in which imaging is performed by the magnetic sensor. The position information and the orientation information may be input to the imaging device 30 by a worker who installs the imaging device 30.

Figure 3:
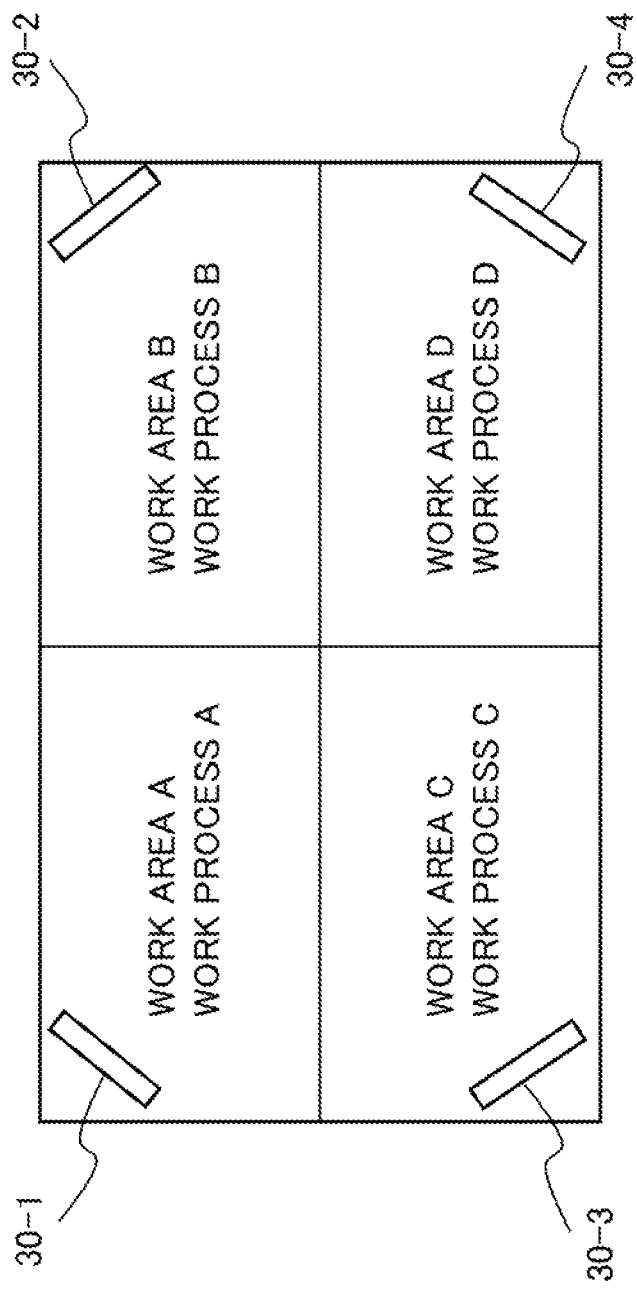
FIG. 3 is a diagram illustrating an example of a work area according to the first example embodiment of the present invention.

An operation when the monitoring device 10 detects the unsafe condition and notifies the administrator terminal 20 of the detected unsafe condition in the monitoring system of the present example embodiment will be described. In the following description, a case where an unsafe condition is detected in a construction site divided into four sections as illustrated in FIG. 3 will be described as an example. FIG. 3 is a diagram schematically illustrating division of the work area at a construction site. In the example of FIG. 3, the work area is divided into four work areas of an area A, an area B, an area C, and an area D. It is assumed that a work process A is performed in the area A, a work process B is performed in the area B, a work process C is performed in the area C, and a work process D is performed in the area D. It is assumed that an imaging device 30-1 is installed in the work area A, an imaging device 30-2 is installed in the work area B, an imaging device 30-3 is installed in the work area C, and an imaging device 30-4 is installed in the work area D. In the example of FIG. 3, the work area is disposed in the planar direction, but the work area may be hierarchized in the upper position or in the underground direction of the building.

Figure 4:
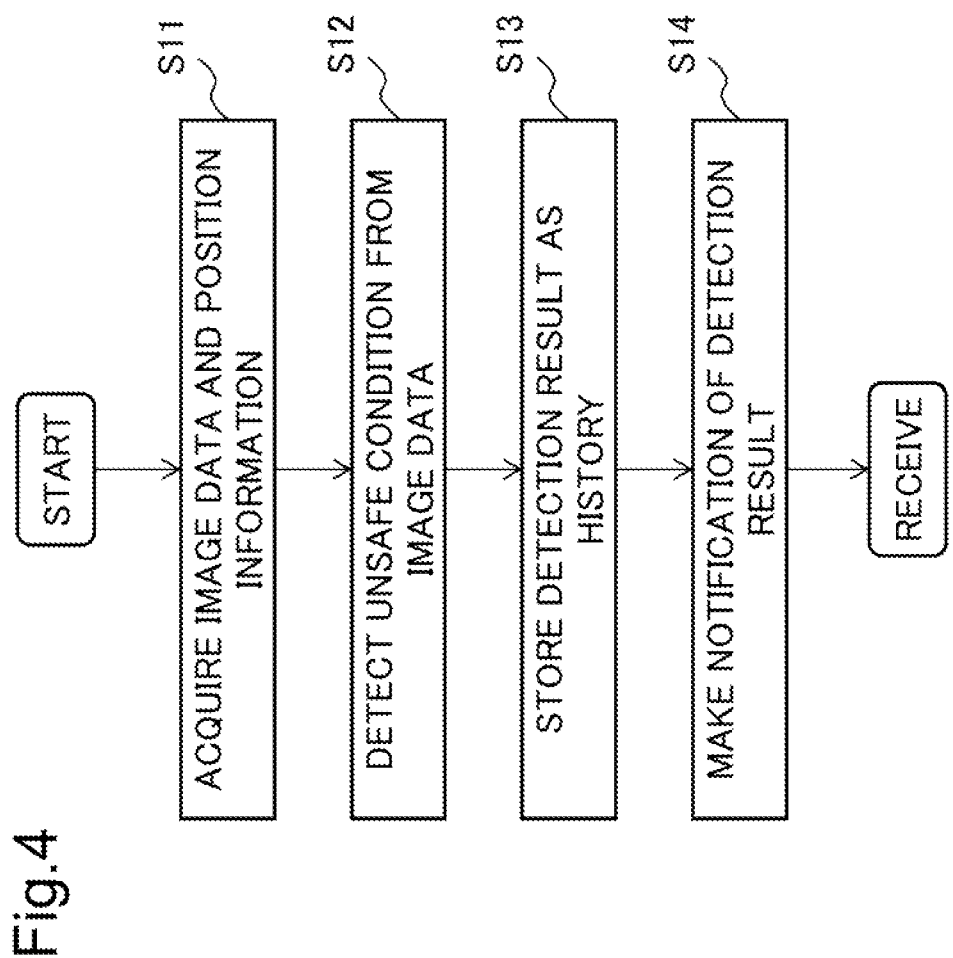
FIG. 4 is a diagram illustrating an operation flow of the monitoring device according to the first example embodiment of the present invention.

First, an operation when the monitoring device 10 detects the unsafe condition and notifies the administrator terminal 20 of the occurrence of the unsafe condition will be described with reference to FIG. 4. FIG. 4 is a diagram illustrating an operation flow when the monitoring device 10 detects the unsafe condition and notifies the information that the unsafe condition has occurred.

The imaging device 30 captures a moving image in the work area to transmit captured image data to the monitoring device 10. The imaging device 30 adds information about the imaging position, the imaging azimuth, and the imaging date and time to transmit the image data to the monitoring device 10.

The image data acquiring unit 11 of the monitoring device 10 acquires the image data, the position information, the orientation information, and the imaging date and time information transmitted from the imaging device 30 (step S11). When the image data acquiring unit 11 acquires image data, the detecting unit 12 determines whether an unsafe condition, that is, an unsafe behavior of the worker or an unsafe surrounding environment is included in the image data. Specifically, the detecting unit 12 detects the motion of the worker in the image data, and compares the motion with the reference data indicating the feature of the motion of the person registered for each unsafe condition. When the reference data indicating any feature of the unsafe condition matches the motion of the worker or the feature of the surrounding environment, the detecting unit 12 determines that the unsafe condition has occurred.

When the unsafe condition is detected from the image data (step S12), the detecting unit 12 calculates the position of the worker or the surrounding environment for which the unsafe condition is detected. When the position of the worker or the like for which the unsafe condition is detected is calculated, the detecting unit 12 stores information about the detected unsafe condition in the storage unit 15 as a history of the detection result (step S13). Specifically, the detecting unit 12 stores in the storage unit 15 the detection result, that is, the information relating to the detected unsafe condition, the position where the unsafe condition has occurred, the occurrence date and time of the unsafe condition, and the image data in association with each other.

When the detecting unit 12 stores the detection result of the unsafe condition as a history, the notifying unit 13 transmits to the administrator terminal 20 the information relating to the unsafe condition, the occurrence position of the unsafe condition, the occurrence date and time of the unsafe condition, and the image data to make notification of the detection result (step S14).

Upon receiving the information relating to the unsafe condition, the occurrence position of the unsafe condition, the occurrence date and time of the unsafe condition, and the image data, the administrator terminal 20 displays the detection result of the unsafe condition. The administrator of the construction site manages and instructs the worker based on the detection result of the unsafe condition acquired from the administrator terminal 20.

Figure 5:
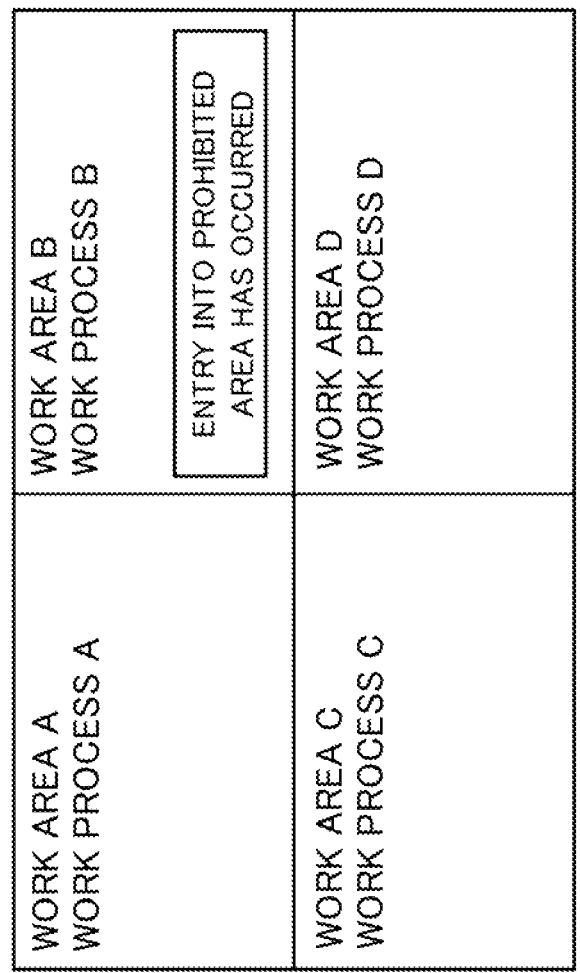
FIG. 5 is a diagram illustrating an example of notification output by the monitoring device according to the first example embodiment of the present invention.

FIG. 5 is a diagram schematically illustrating an example of a screen when the administrator terminal 20 displays the detection result of the unsafe condition received from the monitoring device 10 on the display device. FIG. 5 illustrates a map of a construction site, and illustrates an example of a case where an unsafe condition of entry of a worker into a prohibited area occurs in the work area B on the map. In the example of FIG. 5, "ENTRY INTO PROHIBITED AREA HAS OCCURRED" is displayed in the work area B where the unsafe condition has occurred.

Figure 6:
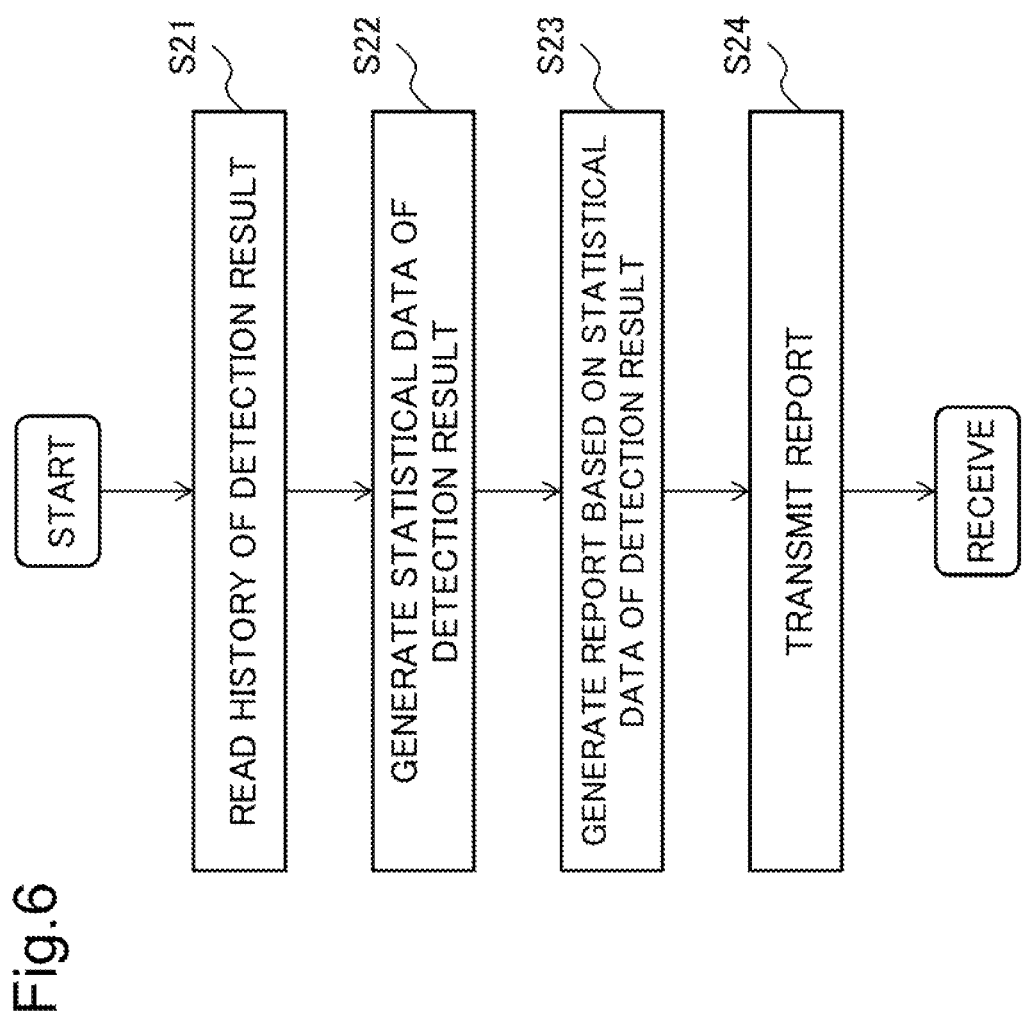
FIG. 6 is a diagram illustrating an operation flow of the monitoring device according to the first example embodiment of the present invention.

Next, in the monitoring system of the present example embodiment, an operation when statistical processing of the unsafe condition detected by the monitoring device 10 is performed and a report is output will be described. FIG. 6 is a diagram illustrating an operation flow when the monitoring device 10 generates the report of the unsafe condition.

When the report generation request is input, the report generating unit 14 starts generating a report of the detection result of the unsafe condition. When the generation of the report is started, the report generating unit 14 reads the history of the detection result from the storage unit 15 (step S21).

When acquiring the history of the detection result, the report generating unit 14 generates statistical data of the detection result (step S22).

For example, the report generating unit 14 aggregates the total number of times of detection of the unsafe condition and the number of times of detection of the unsafe condition for each work area, and generates statistical data. After generating the statistical data, the report generating unit 14 generates a report based on the statistical data (step S23). FIG. 7 is a diagram schematically illustrating an example of a report generated by the report generating unit 14. In the example of FIG. 7, a report in which the number of occurrences of unsafe conditions, the number of occurrences of each unsafe condition, and the number of occurrences for each work area for one month are described is generated. In FIG. 7, an underline of the number of occurrences for each work area indicates an example in which a button for displaying a detailed history is set.

FIG. 8 is a diagram illustrating an example of a report illustrating a detailed history of the one-person work performed in the work area A in FIG. 7. FIG. 8 illustrates an example of a report including information relating to the date and time when the one-person work has occurred and buttons for displaying image data obtained by imaging the one-person work.

After generating the report, the report generating unit 14 transmits the generated report to the administrator terminal 20 (step S24). When receiving the report, the administrator terminal 20 displays the received report on the display device.

An example of detection of the unsafe condition by the monitoring device 10 will be described more specifically. (Detection of One-Person Work)

Figure 9:
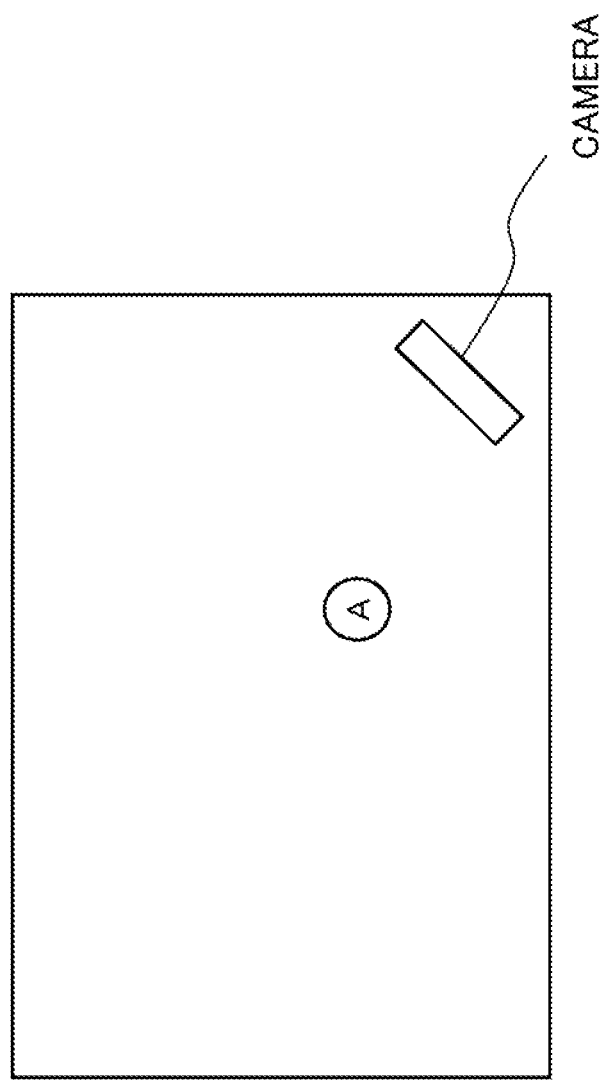
FIG. 9 is a view schematically illustrating an example of a working state in the first example embodiment of the present invention.

An example of detection of one-person work by a worker will be described. The one-person work refers to a state in which an accident or the like cannot be immediately found or handled because there is no other worker around. The detecting unit 12 monitors the image data of each area, and detects that the one-person work has occurred when the time during which the worker works by one person has elapsed for a preset time or more. FIG. 9 is a diagram schematically illustrating an example in which the worker A performs the one-person work. In the example of FIG. 9, the detecting unit 12 determines that one-person work has occurred when the state in which the worker A detected in the work area is alone is longer than or equal to a preset time.

The time for determining that the worker is working alone is set to 15 minutes, for example. The time for determining that the worker is working alone may be other than 15 minutes.

When the occurrence of the one-person work is detected, the detecting unit 12 stores in the storage unit 15 information indicating that the one-person work has occurred, the occurrence date and time of the one-person work, the occurrence area, and the image data when the one-person work has been detected in association with each other. The notifying unit 13 transmits, to the administrator terminal 20, information indicating that the one-person work has occurred as the unsafe behavior, the occurrence area, the occurrence date and time, and image data when the one-person work has been detected.

(Detection of Approach to Construction Machine)

Figure 10:
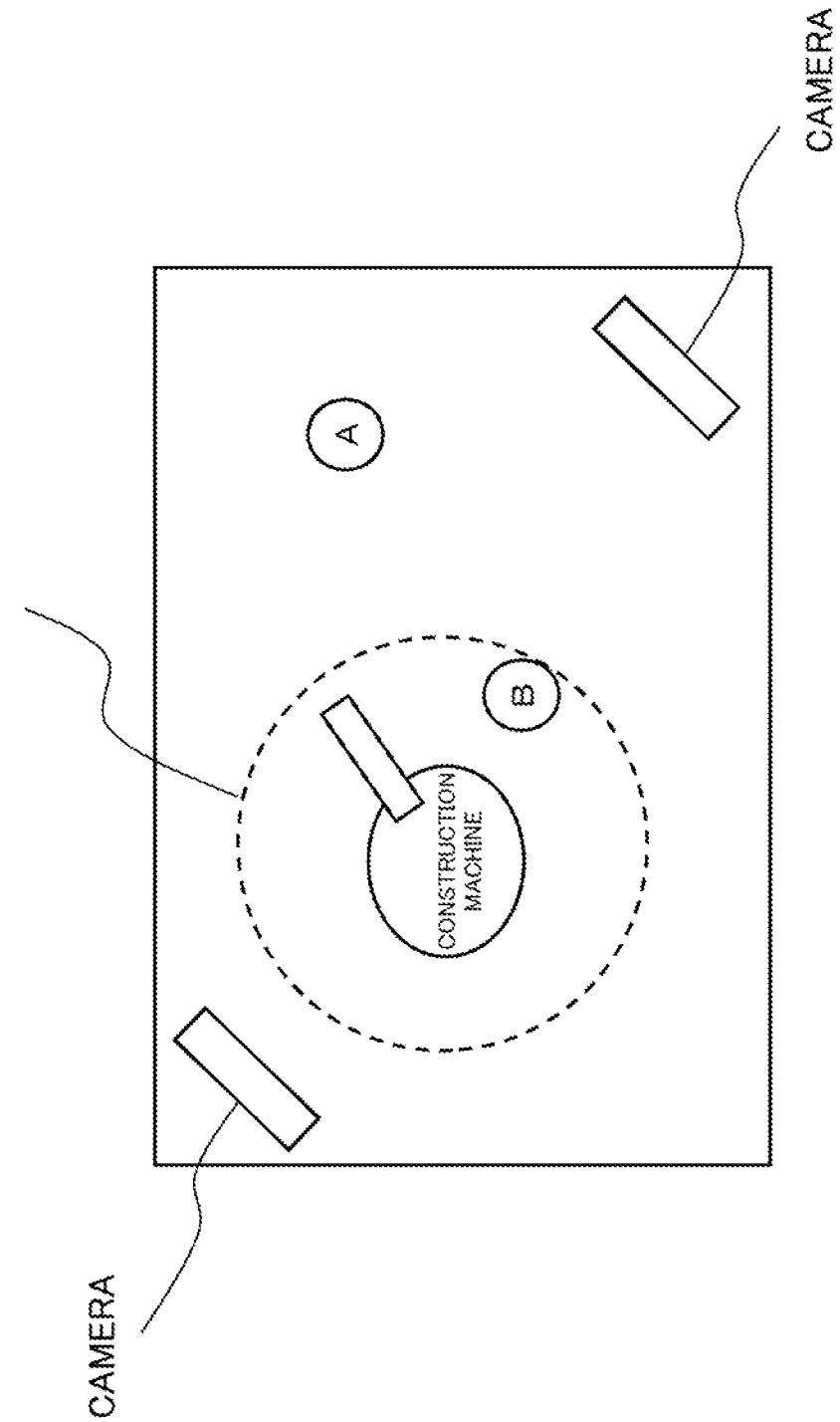
FIG. 10 is a view schematically illustrating an example of a working state in the first example embodiment of the present invention.

An example of detection of approach of the worker to the construction machine will be described. The detecting unit 12 monitors the image data of each area, and monitors the construction machine that is performing the operation and the worker. For example, the detecting unit 12 detects the operation of the construction machine according to the regularity of the operation. For example, the detecting unit 12 may determine that the construction machine exists when the object of the color of the construction machine main body is equal to or larger than a preset size. FIG. 10 illustrates an example in which a construction machine exists in a work area where a worker A and a worker B are working.

The detecting unit 12 determines that an unsafe condition of approach to the construction machine has occurred when the worker approaches within an area set in advance for the size of the construction machine. In the example of FIG. 10, the worker B is present in a dangerous entry area around the construction machine indicated by a broken line. Therefore, the detecting unit 12 detects that an unsafe condition of approach to the construction machine has occurred.

When the approach to the construction machine is detected, the detecting unit 12 stores, in the storage unit 15, the information indicating that the approach to the construction machine has occurred, the date and time when the approach to the construction machine has occurred, the occurrence area, and the image data when the approach to the construction machine has been detected in association with each other. The notifying unit 13 transmits, to the administrator terminal 20, information indicating that approach to the construction machine has occurred, the occurrence area, the occurrence date and time, and image data when the approach to the construction machine has been detected.

(Entry into Entry Prohibited Area)

An example of detection of entry to the entry prohibited area will be described. The detecting unit 12 monitors the image data of each area and monitors the presence or absence of a worker in the entry prohibited area. The detecting unit 12 determines the entry prohibited area by, for example, identifying a floor display indicating the entry prohibited area or a pole indicating the entry prohibited area from the image data.

Figure 11:
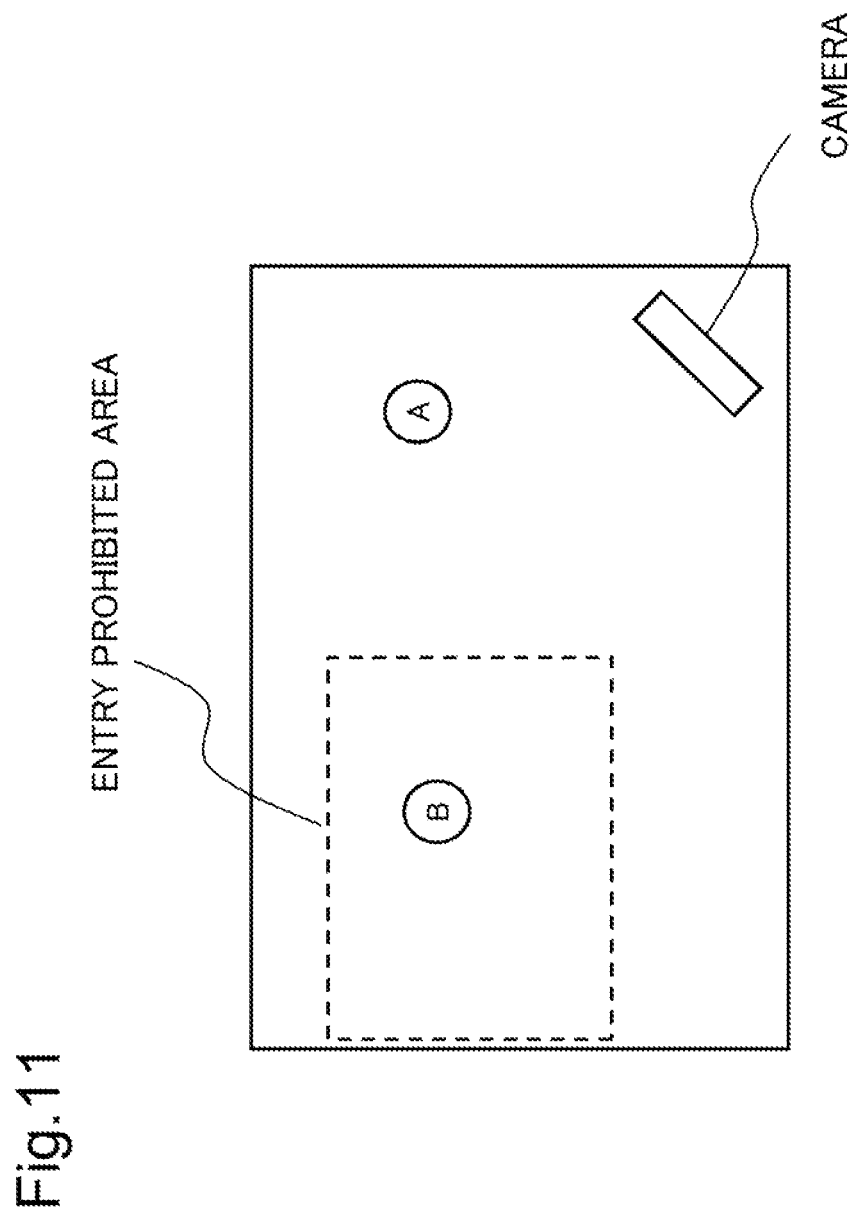
FIG. 11 is a view schematically illustrating an example of a working state in the first example embodiment of the present invention.

Next, when the worker enters the entry prohibited area, the detecting unit 12 determines that an unsafe condition of entry into the entry prohibited area has occurred. FIG. 11 illustrates an example in which an entry prohibited area indicated by a broken line is set in the work area where the worker A and the worker B are working. In the example of FIG. 11, the worker B exists in the entry prohibited area indicated by the broken line. Therefore, the detecting unit 12 detects that an unsafe condition of entry into the entry prohibited area has occurred.

When the entry into the entry prohibited area is detected, the detecting unit 12 stores, in the storage unit 15, information indicating that the entry into the entry prohibited area has occurred, the occurrence date and time of the entry into the entry prohibited area, the occurrence area and image data when the entry into and the entry prohibited area has been detected in association with each other. The notifying unit 13 transmits, to the administrator terminal 20, information indicating that the entry into the entry prohibited area has occurred, the occurrence area, the occurrence date and time, and image data when the entry into the entry prohibited area has been detected.

(Unstable Work at Stepladder)

Figure 12:
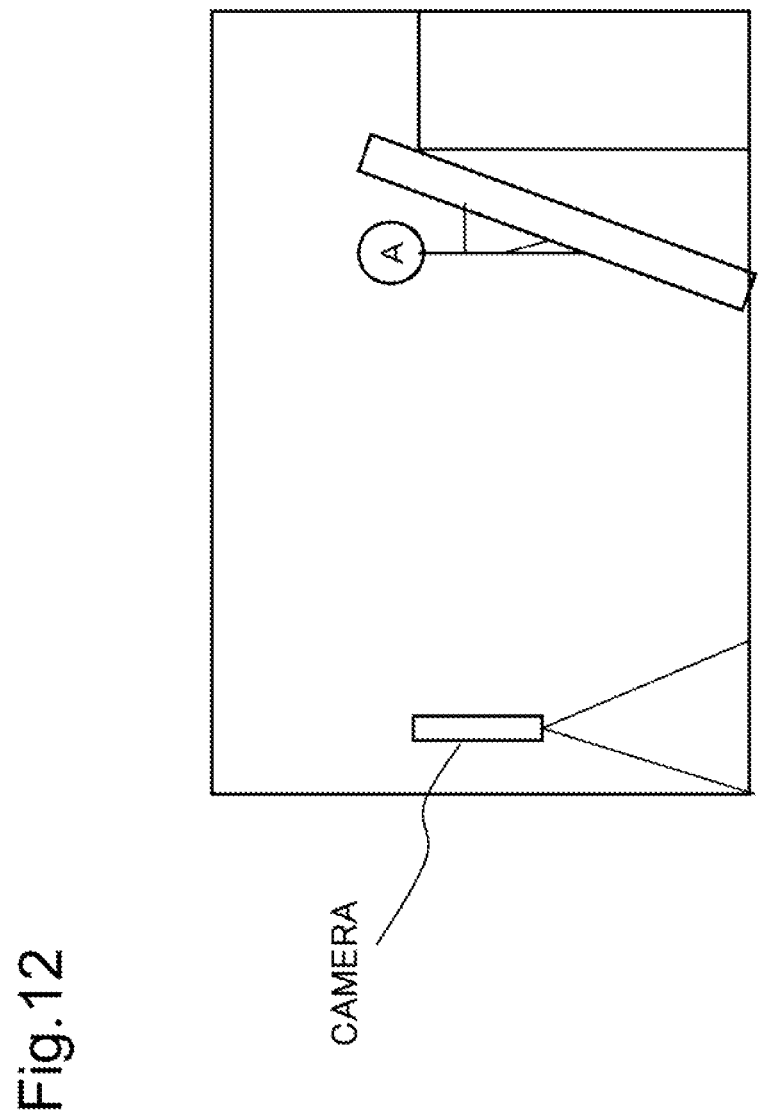
FIG. 12 is a view schematically illustrating an example of a working state in the first example embodiment of the present invention.
Figure 13:
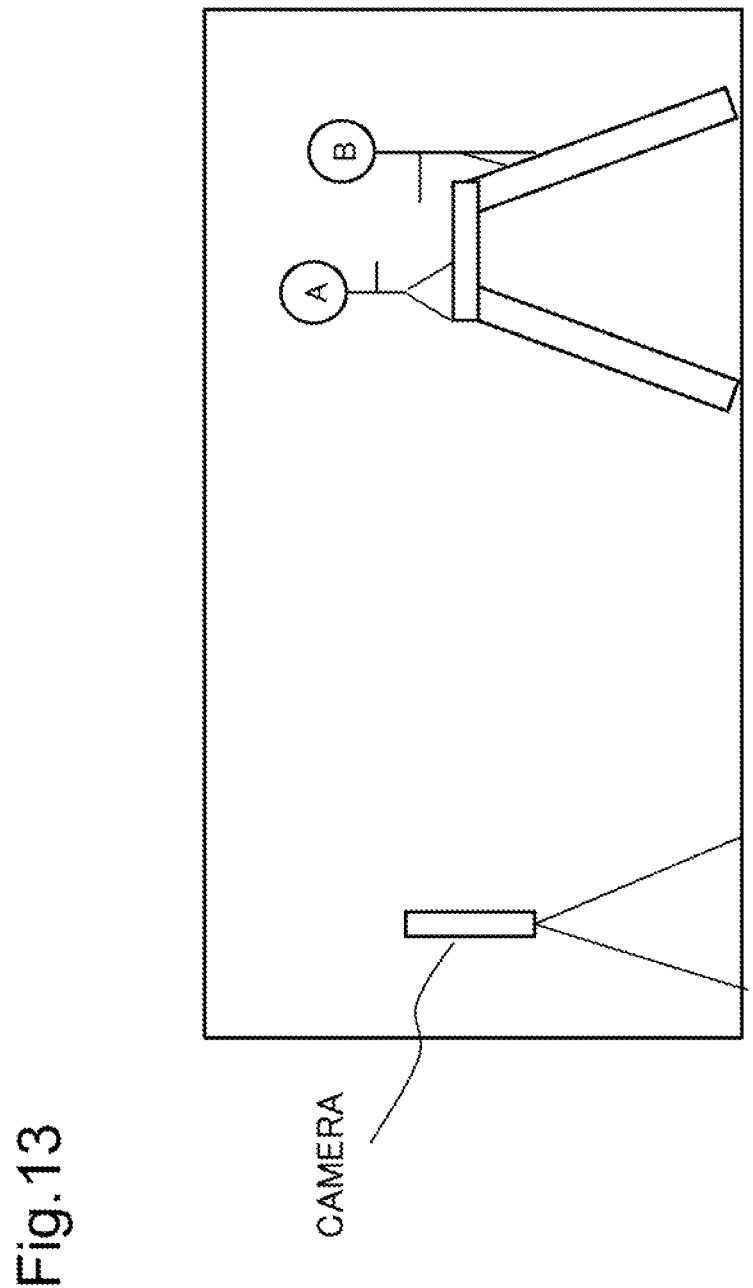
FIG. 13 is a view schematically illustrating an example of a working state in the first example embodiment of the present invention.

An example of detection of an unstable work at a stepladder will be described. The detecting unit 12 monitors the image data of each area and monitors the presence or absence of work at a stepladder. The detecting unit 12 determines the stepladder based on, for example, the shape and color of the stepladder. FIG. 12 illustrates an example in which the worker A is climbing a stepladder. FIG. 13 illustrates an example in which two workers A and B perform work on the top plate of the stepladder, it is assumed that the behavior of climbing a stepladder leaned as shown in FIG. 12 by one-person work or the behavior of two or more people riding on a top plate as shown in FIG. 13 is prohibited as work in an unstable state.

When detecting a prohibited behavior at the stepladder, the detecting unit 12 detects that an unstable work at the stepladder has occurred.

When the unstable work at the stepladder is detected, the detecting unit 12 stores, in the storage unit 15, the information indicating that the unstable work at the stepladder has occurred, the occurrence date and time of the unstable work at the stepladder, the occurrence area, and the image data when the unstable work at the stepladder is detected in association with each other. The notifying unit 13 transmits, to the administrator terminal 20, information indicating that the unstable work at the stepladder has occurred, the occurrence area, the occurrence date and time, and image data when the unstable work at the stepladder has been detected.

(Non-Use of Safety Belt)

Figure 14:
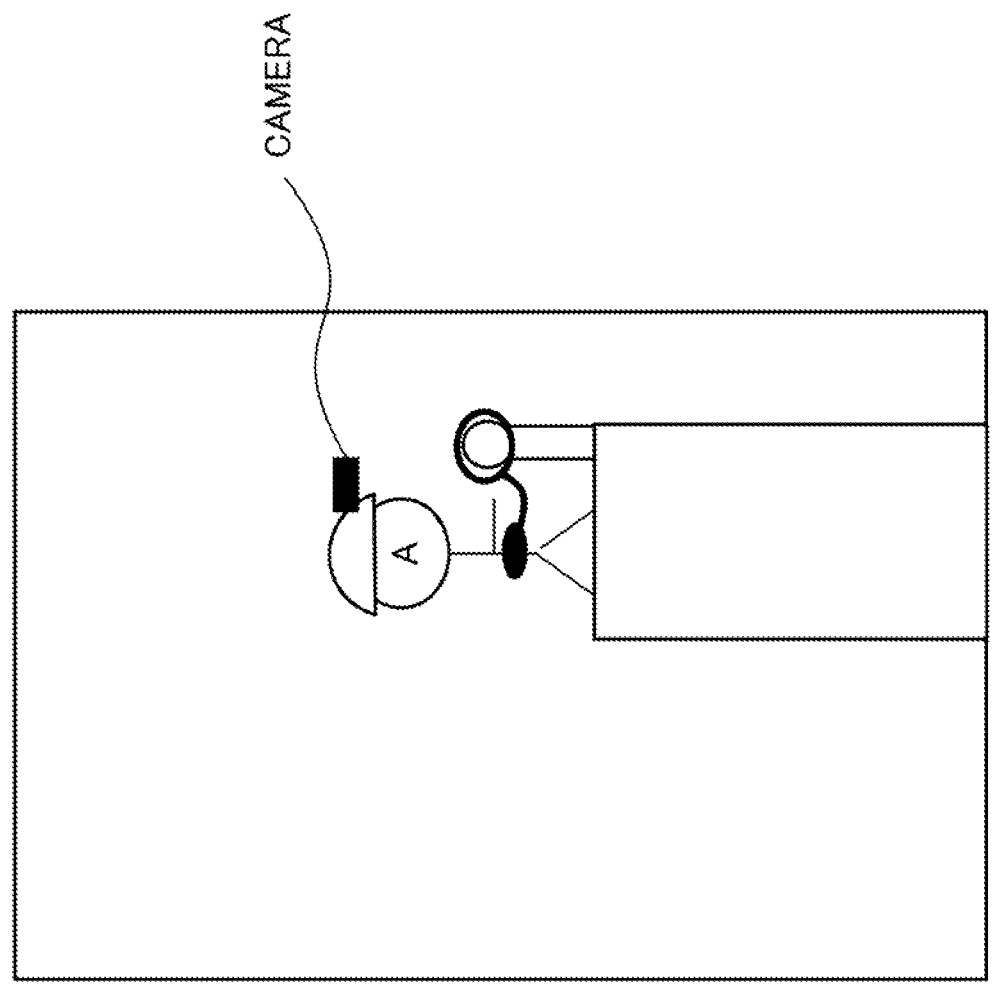
FIG. 14 is a view schematically illustrating an example of a working state in the first example embodiment of the present invention.
Figure 15:
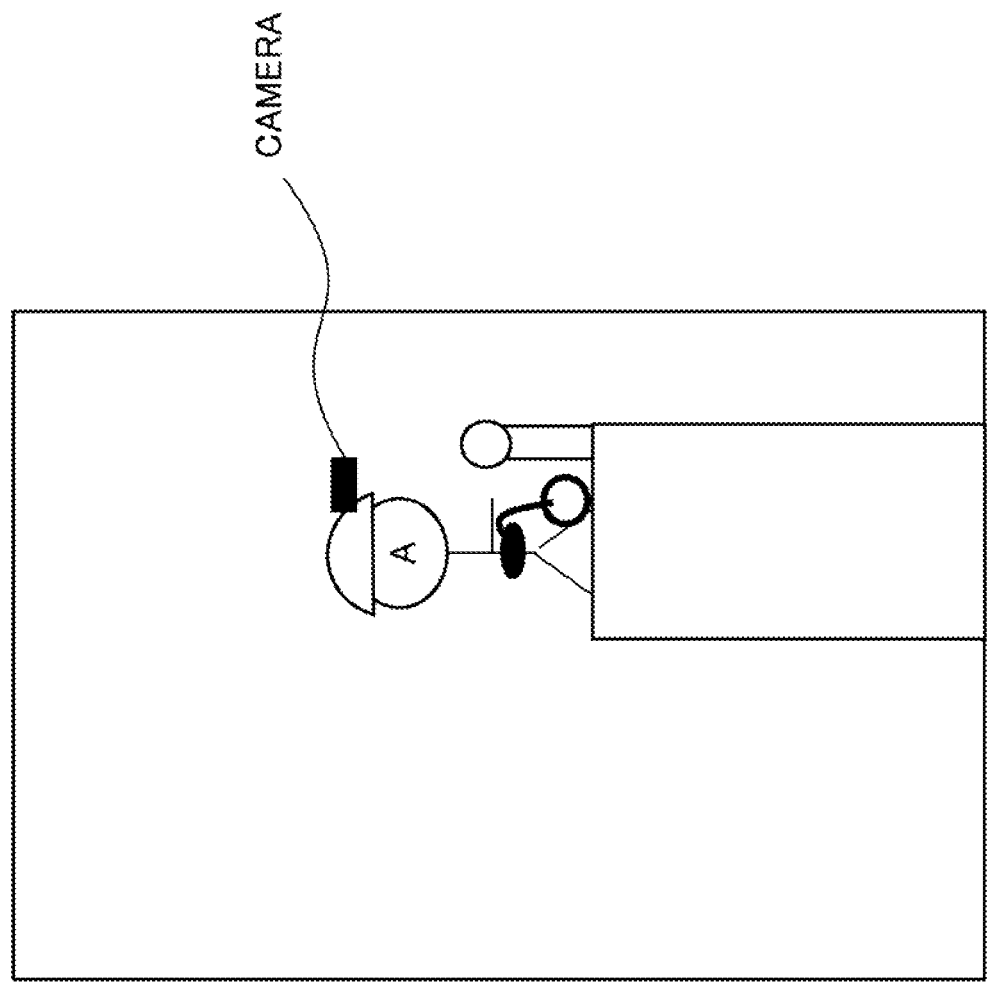
FIG. 15 is a view schematically illustrating an example of a working state in the first example embodiment of the present invention.

An example of detecting non-use of the safety belt will be described. For example, the detecting unit 12 detects non-use of the safety belt from image data wirelessly transmitted from a camera attached to the helmet by the worker. FIG. 14 schematically illustrates an example of a worker whose safety belt is attached to the rod to which the safety belt is to be attached FIG. 15 schematically illustrates an example of a worker whose safety belt is not attached to the rod to which the safety belt is to be attached The detecting unit 12 detects the area of the worker from the image data, identifies the hook of the safety belt and the rod to which the safety belt is to be attached in the area of the worker, and determines whether the hook of the safety belt is attached to the rod to which the safety belt is to be attached. For example, the detecting unit 12 identifies the hook of the safety belt and the rod to which the safety belt is to be attached set to a predetermined color, and determines whether the hook of the safety belt overlaps the rod to which the safety belt is to be attached. As the image data for determining whether the hook of the safety belt is attached to the rod to which the safety belt is to be attached, image data received from a camera installed on a floor or the like may be used as in other examples.

When the safety belt is not attached and the hook of the safety belt does not overlap the rod to which the safety belt is to be attached as illustrated in FIG. 15, or when an image in which the hook of the safety belt overlaps the rod to which the safety belt is attached cannot be acquired, the detecting unit 12 determines that the safety belt is not attached.

When it is determined that the safety belt is not attached and non-use of the unsafe condition of the safety belt is detected, the detecting unit 12 stores, in the storage unit 15, the information indicating that non-use of the safety belt has occurred, the occurrence date and time of non-use of the safety belt, the occurrence area, and the image data when non-use of the safety belt has been detected in association with each other. The notifying unit 13 transmits, to the administrator terminal 20, information indicating that non-use of the safety belt has occurred as the unsafe behavior, the occurrence area, the occurrence date and time, and image data when non-use of the unsafe work in the safety belt has been detected.

(Detection of Danger Around Worker)

Figure 16:
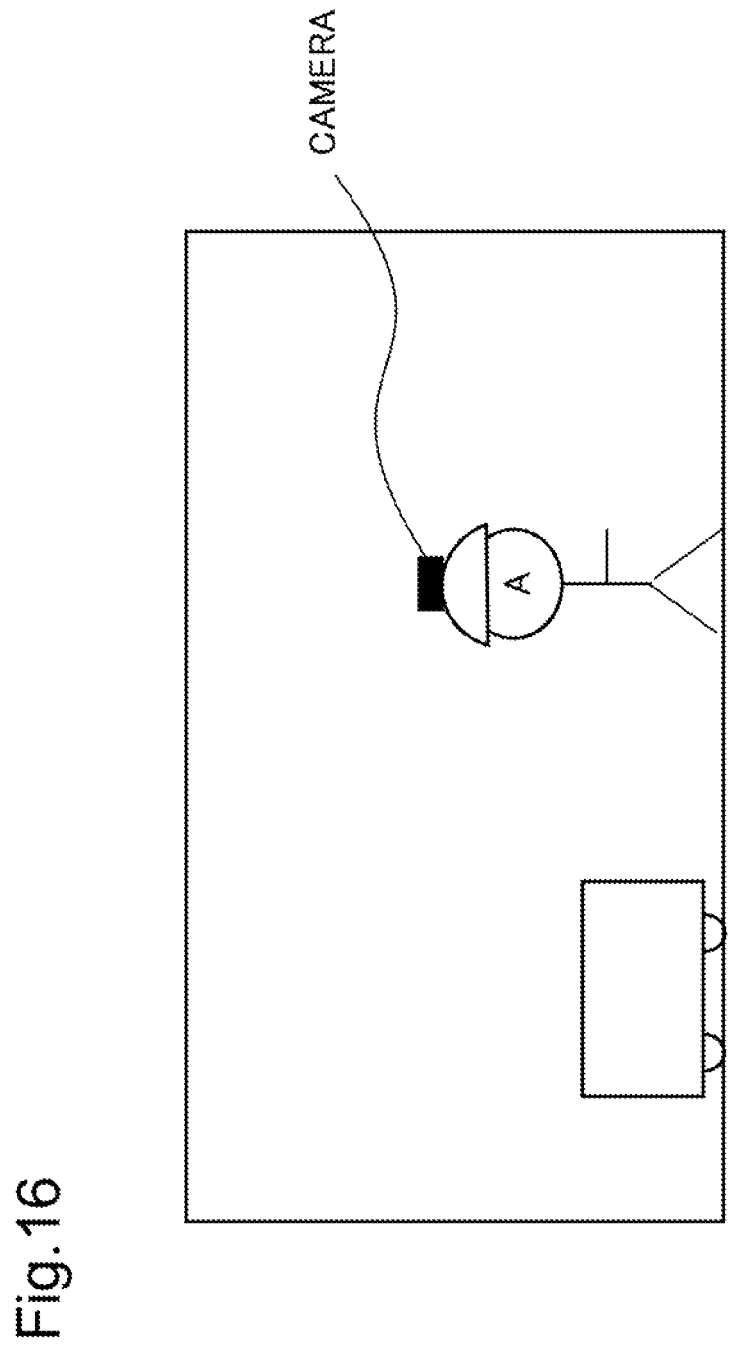
FIG. 16 is a view schematically illustrating an example of a working state in the first example embodiment of the present invention.

Hazard detection around the worker performed to suppress the occurrence of the unsafe condition will be described. For example, the detecting unit 12 detects danger around the worker from image data wirelessly transmitted from a camera that can perform imaging 360 degrees attached to the helmet by the worker. FIG. 16 schematically illustrates a situation in which the automatically traveling instrument is approaching behind the worker wearing the camera capable of perform imaging 360 degrees on the helmet. Image data received from a camera installed on a floor or the like may be used as the image data for determining whether a danger around the worker has occurred.

The detecting unit 12 monitors whether another worker or a moving body approaches. For example, the detecting unit 12 determines that a dangerous state has occurred around the worker when a moving body or another worker approaching the worker is detected from a direction that is a blind spot of the worker.

When determining that the dangerous state has occurred around the worker, the detecting unit 12 stores, in the storage unit 15, information indicating that the dangerous state has occurred around the worker, a date and time when the dangerous state has occurred around the worker, and image data when the dangerous state has occurred in the occurrence area and around the worker in association with each other. The notifying unit 13 transmits, to the administrator terminal 20, information indicating that a dangerous state has occurred around the worker, the occurrence area, the occurrence date and time, and image data when the dangerous state has occurred around the worker.

(Detection of Area where Accident is Likely to Occur)

Figure 17:
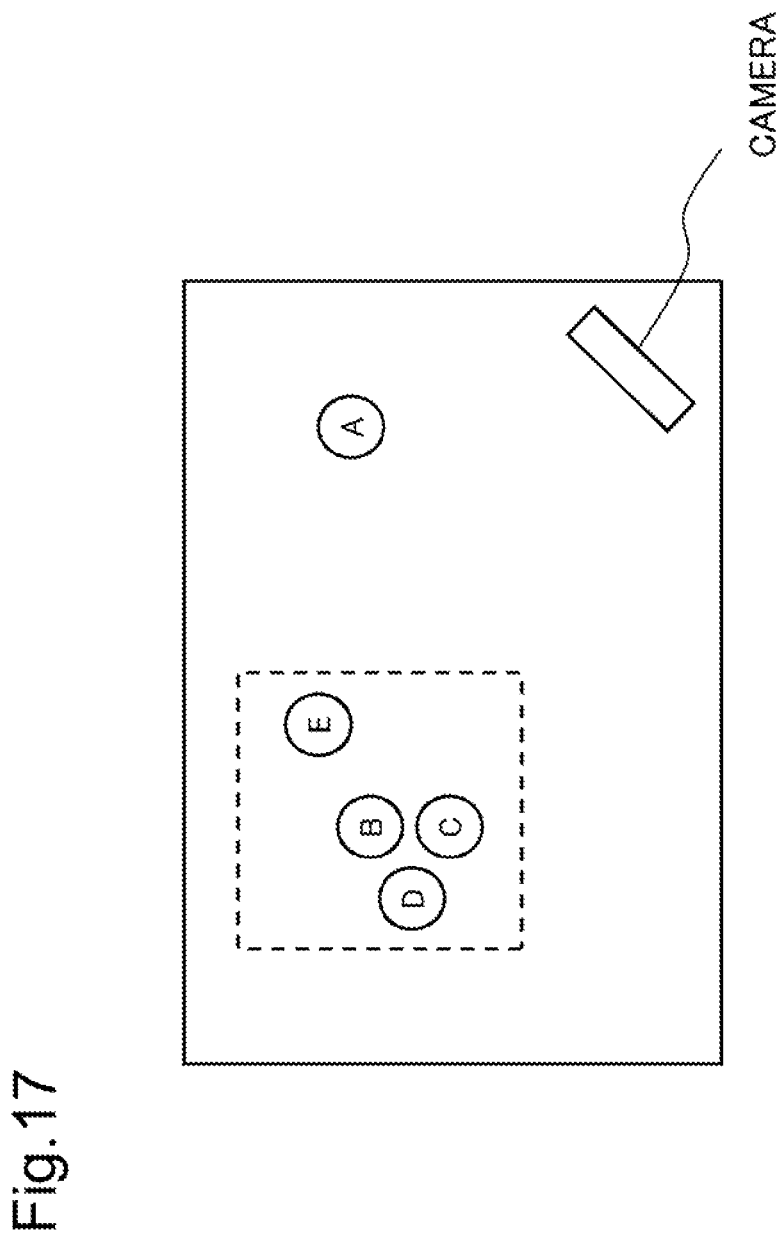
FIG. 17 is a view schematically illustrating an example of a working state in the first example embodiment of the present invention.

An example of detection of an area where an accident is likely to occur will be described. The detecting unit 12 monitors the image data of each area, and monitors whether the workers and the construction machines are dense. FIG. 17 schematically illustrates a state in which a worker A, a worker B, a worker C, a worker D, and a worker E are working in the work area.

For example, when the detecting unit 12 detects the number of workers equal to or larger than the reference number within a preset range, the detecting unit 12 determines that the workers are dense and an accident is likely to occur. The broken line in FIG. 17 schematically indicates the size of the range for determining whether the workers are dense.

When detecting the number of workers equal to or larger than the reference number within the preset range, the detecting unit 12 detects that there is an area where workers are dense and an accident is likely to occur. The reference of the number of workers when the detecting unit 12 determines whether the workers are dense may be different depending on the number of construction machines disposed within the range.

When an area in which an accident is likely to occur is detected, the detecting unit 12 stores, in the storage unit 15, information indicating that an area in which an accident is likely to occur has occurred, the occurrence date and time of the area in which an accident is likely to occur, the occurrence area, and image data when the area in which an accident is likely to occur is detected in association with each other. The notifying unit 13 transmits, to the administrator terminal 20, information indicating that an area in which an accident is likely to occur has occurred, the occurrence area, the occurrence date and time, and image data when an area in which an accident is likely to occur is detected.

(Detection of Floor Opening)

Figure 18:
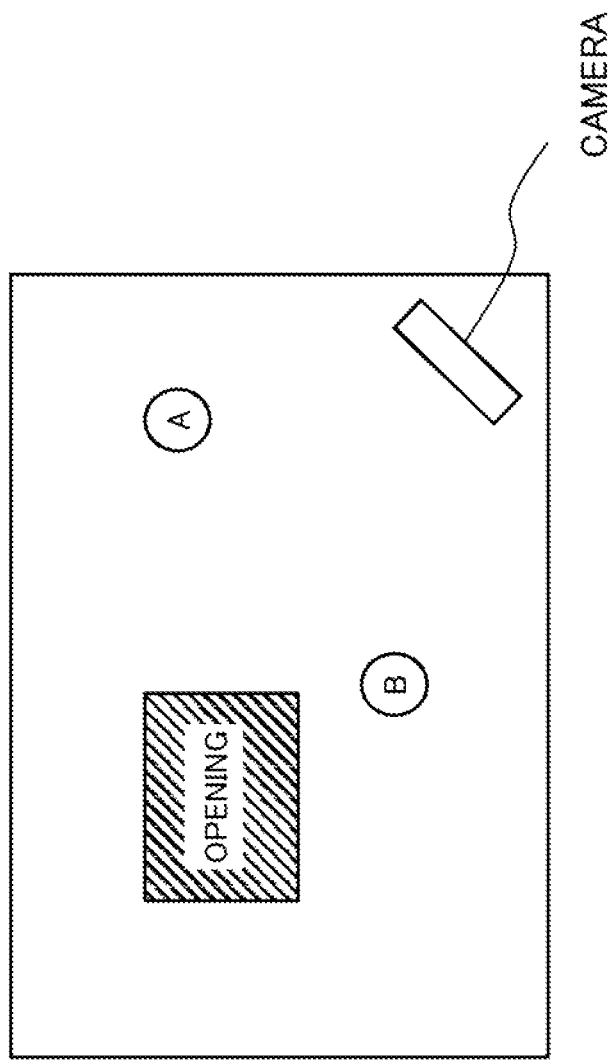
FIG. 18 is a view schematically illustrating an example of a working state in the first example embodiment of the present invention.

An example of detection of an opening on a floor will be described. The detecting unit 12 monitors image data of each area, and detects the presence or absence of an opening of a floor. FIG. 18 schematically illustrates an example in which an opening is present on the floor in the work area.

The opening of the floor is provided for an entrance to the underfloor space of the worker at the time of working at the underfloor space, lifting of a material, and the like. On the other hand, the presence of the opening may lead to an accident such as falling of the worker.

For example, the detecting unit 12 detects the presence of the opening based on a difference in color between the floor and the opening. When detecting the opening, the detecting unit 12 stores, in the storage unit 15, the information indicating that the opening has been detected, the detection date and time of the opening, the detection area, and the image data when the opening has been detected in association with each other. The detecting unit 12 may detect the presence or absence of the opening when the scheduled time of work end has passed. When the detecting unit 12 stores the detection result, the notifying unit 13 transmits, to the administrator terminal 20, the information indicating that the opening has been detected, the detection date and time of the opening, the detection area, and the image data when the opening has been detected.

Other Examples

In each of the above examples, the examples of detecting the unsafe condition are described. However, for verification of an accident or verification of work, image data when the unsafe condition is not detected in addition to when the unsafe condition is detected may be stored. For example, by constantly storing image data, it is possible to verify a factor of an accident based on an operation state such as a position and an operation direction at the time of occurrence of the accident. By storing the image data regardless of the presence or absence of the unsafe work when the presence of the worker or the operation of the construction machine is detected, the image data can be used in the verification when an accident occurs or in the verification of the safety of the work.

In the monitoring system of the present example embodiment, the monitoring device 10 detects the unsafe condition from the image data acquired from the imaging device 30, stores the history of the detection result, and notifies the administrator terminal 20 of the history. Therefore, the supervisor of the construction site can recognize the occurrence of the unsafe condition through the administrator terminal 20. Since the imaging device 30 can be moved, when the work process changes with the progress of the work, the device is disposed at a position suitable for monitoring according to the work content, so that an accuracy of monitoring can be improved.

The monitoring device 10 generates statistical data of the occurrence state of the unsafe condition based on the data in which the history of the detection result of the unsafe condition is stored, and generates a report based on the statistical data. In the monitoring system of the present example embodiment, by notifying the administrator terminal 20 of appropriate information necessary for safety management of the worker, the administrator or the like can more accurately recognize the occurrence of the unsafe condition and use the information about the occurrence tendency when performing safety measures, guidance of the worker, and the like.

Second Example Embodiment

Figure 19:
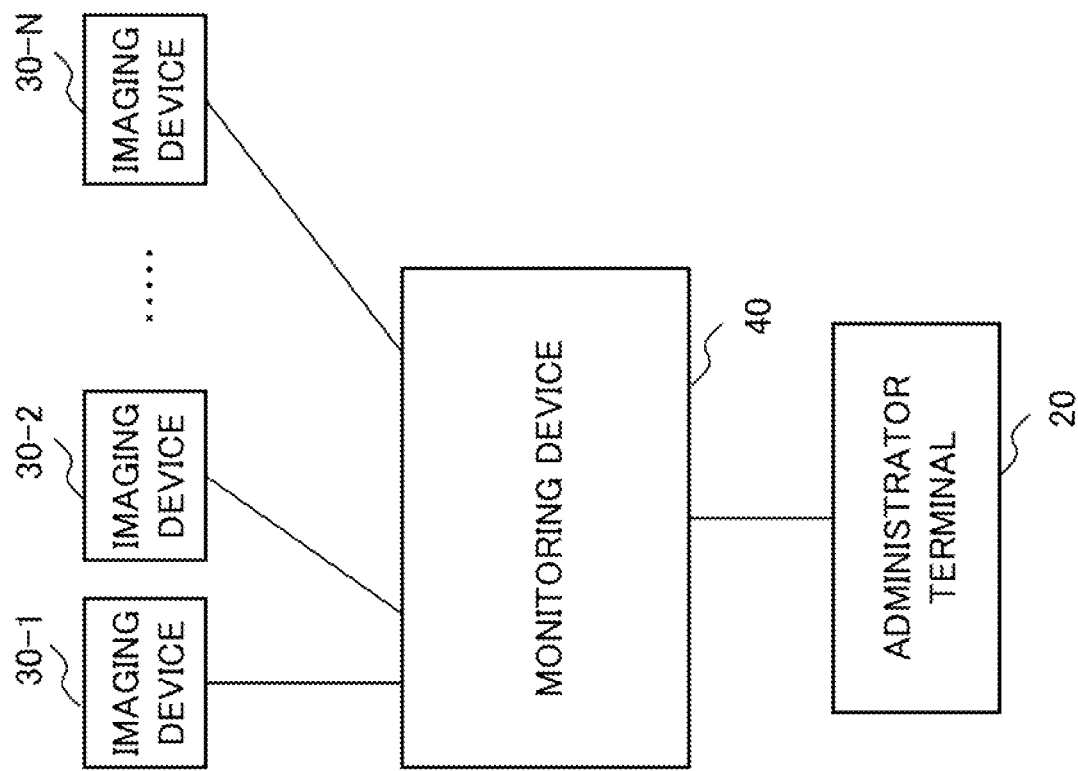
FIG. 19 is a diagram illustrating an example of a configuration of a monitoring system according to a second example embodiment of the present invention.

A second example embodiment of the present invention will be described in detail with reference to the drawings. FIG. 19 is a diagram illustrating an example of a configuration of a monitoring system of the present example embodiment. The monitoring system of the present example embodiment includes a monitoring device 40, the administrator terminal 20, and the imaging device 30. The monitoring system of the present example embodiment is a system that monitors safety of work at a construction site based on image data, as in the monitoring system of the first example embodiment.

The monitoring system of the first example embodiment detects the occurrence of the unsafe condition for each work area, stores the detection result, and notifies the administrator terminal of the detection result. In addition to such a configuration, the monitoring system of the present example embodiment is characterized in that an individual is identified by face recognition when an unsafe condition is detected, and notification and statistics are individually performed.

The configurations and functions of the administrator terminal 20 and the imaging device 30 of the present example embodiment are similar to those of the administrator terminal 20 and the imaging device 30 of the first example embodiment, respectively.

Figure 20:
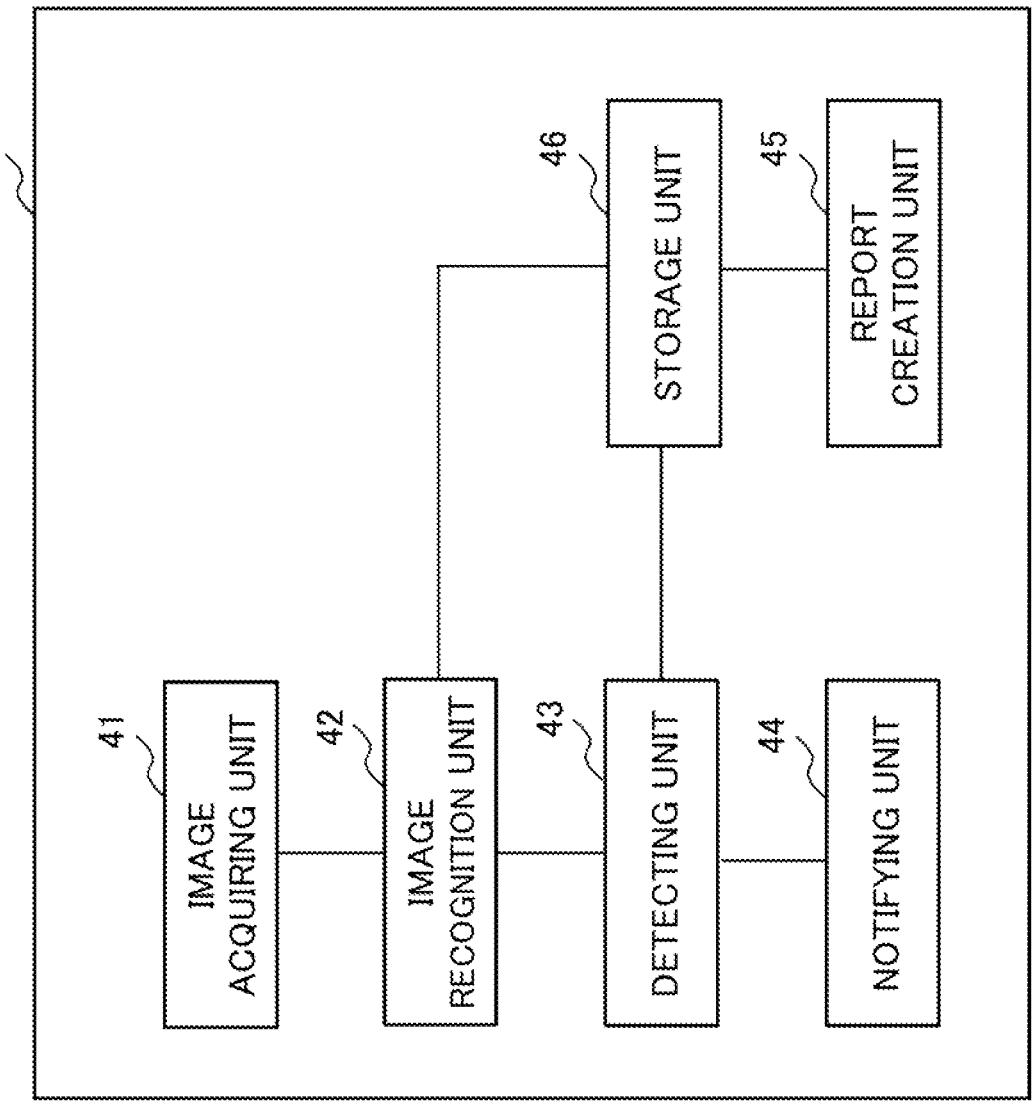
FIG. 20 is a diagram illustrating a configuration of a monitoring device according to the second example embodiment of the present invention.

A configuration of the monitoring device 40 will be described. FIG. 20 is a diagram illustrating a configuration of the monitoring device 40 according to the present example embodiment. The monitoring device 40 includes an image data acquiring unit 41, an image recognition unit 42, a detecting unit 43, a notifying unit 44, a report generating unit 45, and a storage unit 46.

The image data acquiring unit 41 acquires the image data, the date and time when the image data is captured, and information relating to the position where the image data is captured from the imaging device 30.

The image recognition unit 42 detects a person from the image data and identifies an individual by face recognition. The image data of the face of each worker is stored in the storage unit 46. The priority of the data used for the face recognition may be given based on the work schedule data or the entrance record for each time or region. For example, the face recognition may be performed by preferentially referring to the registration data of the work scheduled person in the target area, and when the target person cannot be detected, the collation target may be expanded like a person with an entrance record or a registered person. By performing such collation, the processing speed at the time of face recognition is improved. The image recognition unit 42 transmits the information about the individual identified by the face recognition to the detecting unit 43.

The detecting unit 43 detects the unsafe condition from the image data as in the detecting unit 12 of the first example embodiment. When detecting the unsafe condition, the detecting unit 43 transmits, to the notifying unit 44, information relating to a person who performed a behavior of the unsafe condition, information relating to the unsafe behavior, an occurrence date and time, an occurrence place, and image data. When detecting the unsafe condition, the detecting unit 43 stores, in the storage unit 46, information relating to a person who performed a behavior of the unsafe condition, information relating to the unsafe behavior, an occurrence date and time, an occurrence place, and image data in association with each other. When no person is detected from the image data, the detecting unit 43 does not output the information relating to the person to the notifying unit 44 and does not store the information relating to the person in the storage unit 46.

The notifying unit 44 transmits, to the administrator terminal 20, the information relating to the unsafe condition, the information relating to the person in the image data, the date and time when the unsafe condition has occurred, the place where the unsafe condition has occurred, and the image data.

The report generating unit 45 generates statistical data of the detection result of the unsafe condition. The report generating unit 45 generates a report based on the statistical data and transmits the generated report to the administrator terminal 20.

Each processing in the image data acquiring unit 41, the image recognition unit 42, the detecting unit 43, the notifying unit 44, and the report generating unit 45 is performed, for example, by a CPU executing a computer program. Each processing in the image data acquiring unit 41, the image recognition unit 42, the detecting unit 43, the notifying unit 44, and the report generating unit 45 may be performed using a semiconductor device such as an FPGA.

The storage unit 46 stores information relating to a person who performed a behavior of the unsafe condition, a date and time when the unsafe condition has occurred, a place where the unsafe condition has occurred, and image data of the unsafe condition in association with each other. The storage unit 46 is formed using, for example, a nonvolatile semiconductor storage device. The storage unit 46 may be formed by a storage device such as a hard disk drive or a combination of a plurality of types of storage devices.

An operation when the monitoring device 40 detects the unsafe condition in the monitoring system of the present example embodiment will be described. In the following description, as in the first example embodiment, a case where an unsafe condition is detected in a construction site divided into four sections as illustrated in FIG. 3 will be described as an example.

Figure 21:
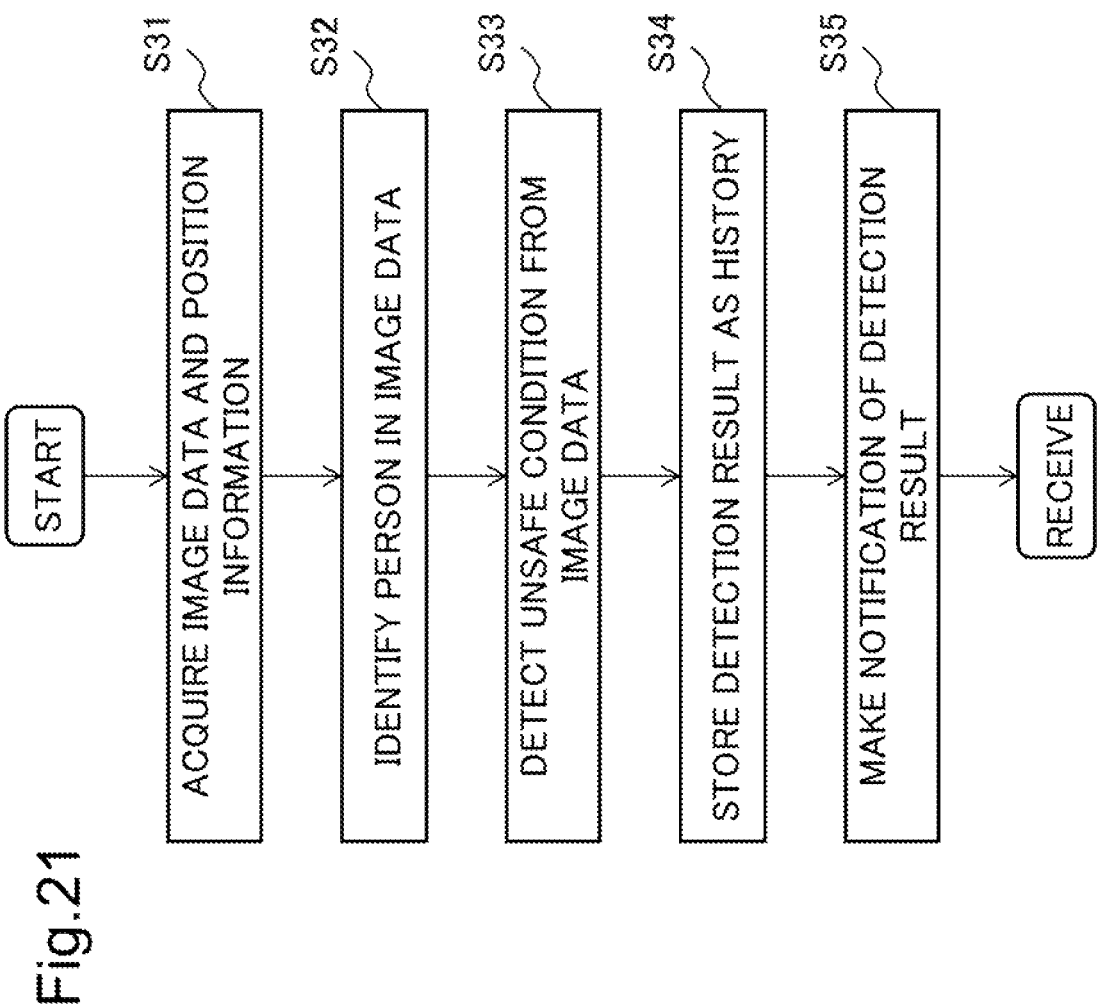
FIG. 21 is a diagram illustrating an operation flow of a monitoring device according to the second example embodiment of the present invention.

First, an operation when the monitoring device 40 detects the unsafe condition and notifies the administrator terminal 20 of the occurrence of the unsafe condition will be described with reference to FIG. 21. FIG. 21 is a diagram illustrating an operation flow when the monitoring device 40 detects the unsafe condition and notifies the information that the unsafe condition has occurred.

The imaging device 30 captures a moving image in the work area to transmit captured image data to the monitoring device 40. The imaging device 30 adds information about the imaging position, the imaging azimuth, and the imaging date and time to transmit the image data to the monitoring device 40.

The image data acquiring unit 41 of the monitoring device 40 acquires the image data, the position information, the orientation information, and the imaging date and time information transmitted from the imaging device 30 (step S31). When the image data acquiring unit 41 acquires the image data, the image recognition unit 42 detects the face of the person appearing in the image. When detecting the face of the person appearing in the image, the image recognition unit 42 collates the face detected from the image with the face photograph stored in the storage unit 46 to identify the person appearing in the image (step S32). When identifying the person as a human figure in the image, the image recognition unit 42 transmits information relating to the identified person to the detecting unit 43 together with the image data.

When receiving the image data and the information relating to the person, the detecting unit 43 determines whether the unsafe condition is included in the image data. The detecting unit 43 compares the motion of the worker or the feature of the surrounding environment in the image data with the reference data registered for each unsafe condition. When the reference data regarding the feature of the unsafe condition matches the feature data indicating the motion of the worker or the feature of the surrounding environment, the detecting unit 43 determines that the unsafe condition has occurred.

When the unsafe condition is detected from the image data (step S33), the detecting unit 43 calculates the position of the worker or the surrounding environment for which the unsafe condition is detected. When the position of the worker or the like for which the unsafe condition is detected is calculated, the detecting unit 43 stores, in the storage unit 46, the detected unsafe condition as a history of the detection result (step S34). The detecting unit 43 stores, in the storage unit 46, the detected information relating to the unsafe condition, the person who performed a behavior of the unsafe condition, the place where the unsafe condition has occurred, the occurrence date and time of the unsafe condition, and the image data as a history of the detection result of the unsafe condition in association with each other.

When the detecting unit 43 stores the detection result of the unsafe condition, the notifying unit 44 transmits, to the administrator terminal 20, the detected information relating to the unsafe condition, the person who performed a behavior of the unsafe condition, the place where the unsafe condition has occurred, the occurrence date and time of the unsafe condition, and the image data.

When the information relating to the unsafe condition, the person who performed a behavior of the unsafe condition, the place where the unsafe condition has occurred, the occurrence date and time of the unsafe condition, and the image data are received, the administrator terminal 20 displays the detection result of the unsafe condition. The administrator of the construction site manages and instructs the worker based on the detection result of the unsafe condition acquired from the administrator terminal 20.

Figure 22:
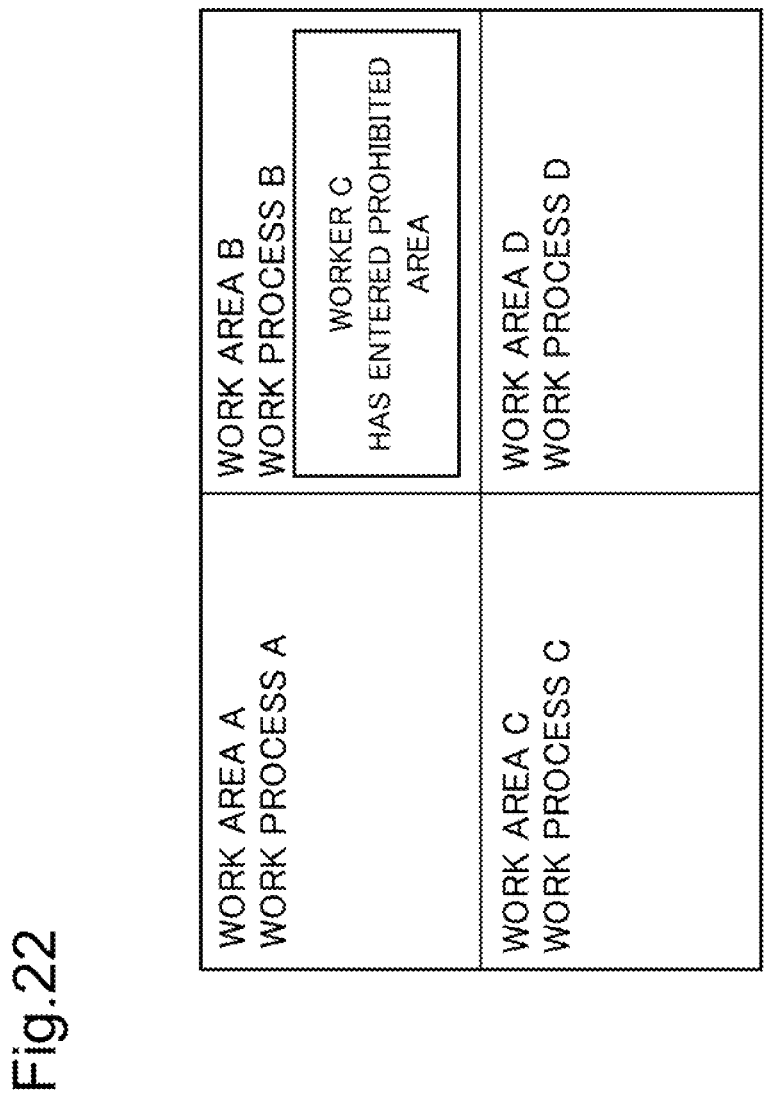
FIG. 22 is a diagram illustrating an example of notification output by the monitoring device according to the second example embodiment of the present invention.

FIG. 22 is a diagram schematically illustrating an example of a screen displayed on the display device by the administrator terminal 20. FIG. 22 illustrates an example of a case where an unsafe condition occurs in the work area B on the map of the construction site. In the example of FIG. 22, "WORKER C HAS ENTERED PROHIBITED AREA" is displayed in the work area B where the unsafe condition of entry into the entry prohibited area has occurred, and the entry of the worker C into the entry prohibited area is notified.

In the above description, the unsafe condition is detected after the person in the image data is identified, but the image recognition unit 42 may identify the worker who performed the unsafe behavior only when the detecting unit 43 detects the unsafe behavior.

Figure 23:
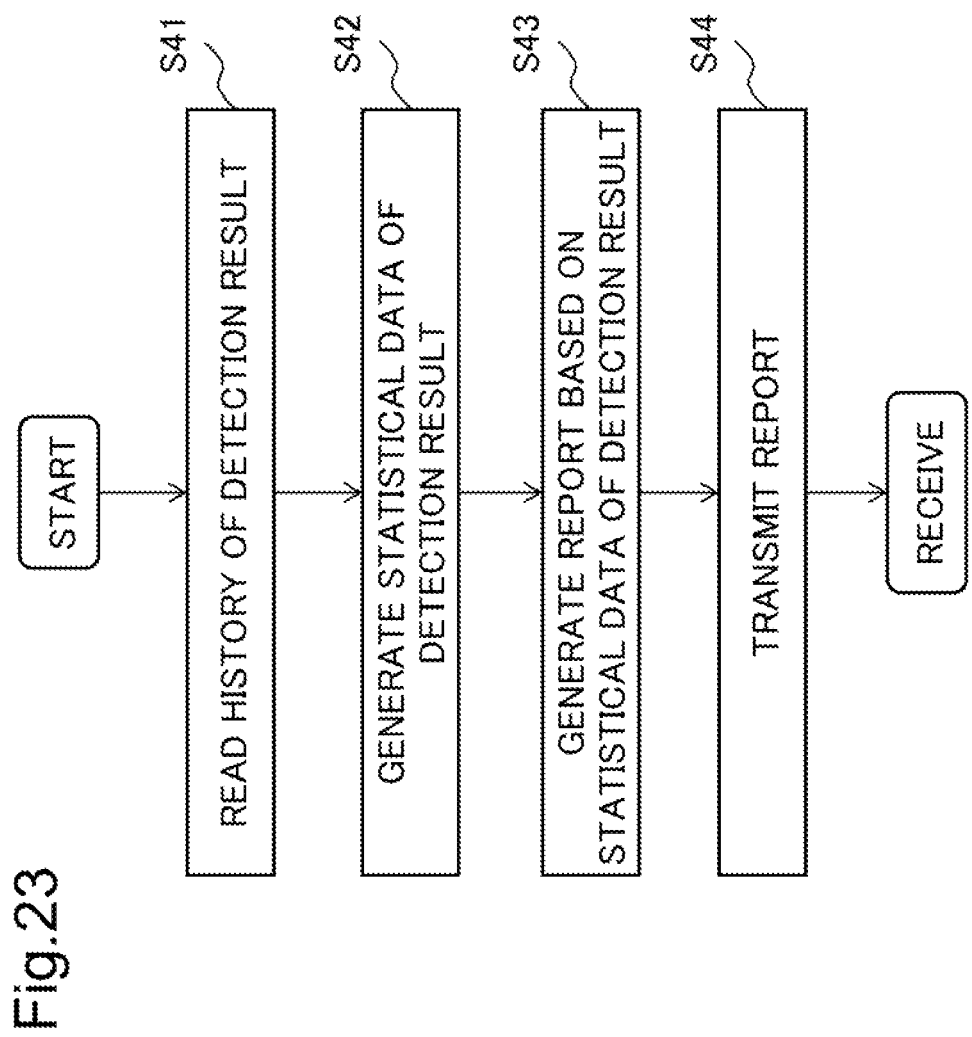
FIG. 23 is a diagram illustrating an operation flow of a monitoring device according to a second example embodiment of the present invention.

Next, in the monitoring system of the present example embodiment, an operation when the statistical data of the unsafe behavior detected by the monitoring device 40 is generated and the report of the occurrence situation of the unsafe condition is output will be described. FIG. 23 is a diagram illustrating an operation flow when the monitoring device 40 generates a report of the occurrence situation of the unsafe condition.

When the generation of the report of the detection result of the unsafe condition is started, the report generating unit 45 reads the history of the detection result from the storage unit 46 (step S41). When acquiring the history of the detection result, the report generating unit 45 generates statistical data of the detection result (step S42).

For example, the report generating unit 45 aggregates the number of times of detection of the unsafe condition for each unsafe condition, for each work area, and for each worker, and generates statistical data. After generating the statistical data, the report generating unit 45 generates a report based on the statistical data (step S43).

FIG. 24 is a diagram schematically illustrating an example of a report generated by the report generating unit 45. In the example of FIG. 24, a report of the detection number of one-person work for one month is generated. In the example of FIG. 24, the number of occurrences of work areas for each unsafe behavior is illustrated. In the example of FIG. 24, a detailed history is set to be displayed by selecting a portion related to the number of occurrences.

FIG. 25 is a diagram illustrating an example of a detailed history of each work area. FIG. 25 illustrates an example of a report including the number of one-person works for each worker, information relating to the date and time when the work occurred, the name of the worker who performed the one-person work, and a button for displaying image data obtained by imaging the one-person work. By outputting such a report, the supervisor can perform safety guidance and the like for each worker who performed an unsafe behavior.

After generating the report, the report generating unit 45 transmits the generated report to the administrator terminal 20 (step S44). When receiving the report, the administrator terminal 20 displays the received report on the display device.

The monitoring device 40 of the monitoring system of the present example embodiment identifies the worker from the image data, and stores the information relating to the unsafe behavior, the occurrence place, the date and time, and the image data for each worker who performed the unsafe behavior. By generating the report based on the stored data, the monitoring device 40 of the present example embodiment can provide the administrator or the like with information indicating a tendency of each worker such as information relating to the worker who frequently performs an unsafe behavior.

Third Example Embodiment

Figure 26:
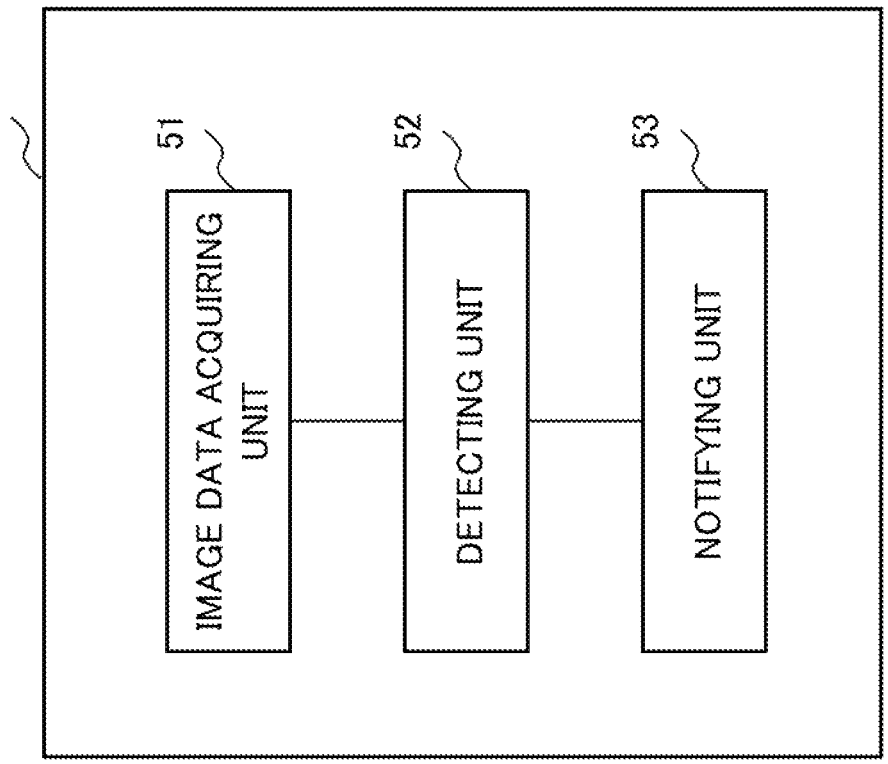
FIG. 26 is a diagram illustrating a configuration of a monitoring device according to a third example embodiment of the present invention.
Figure 27:
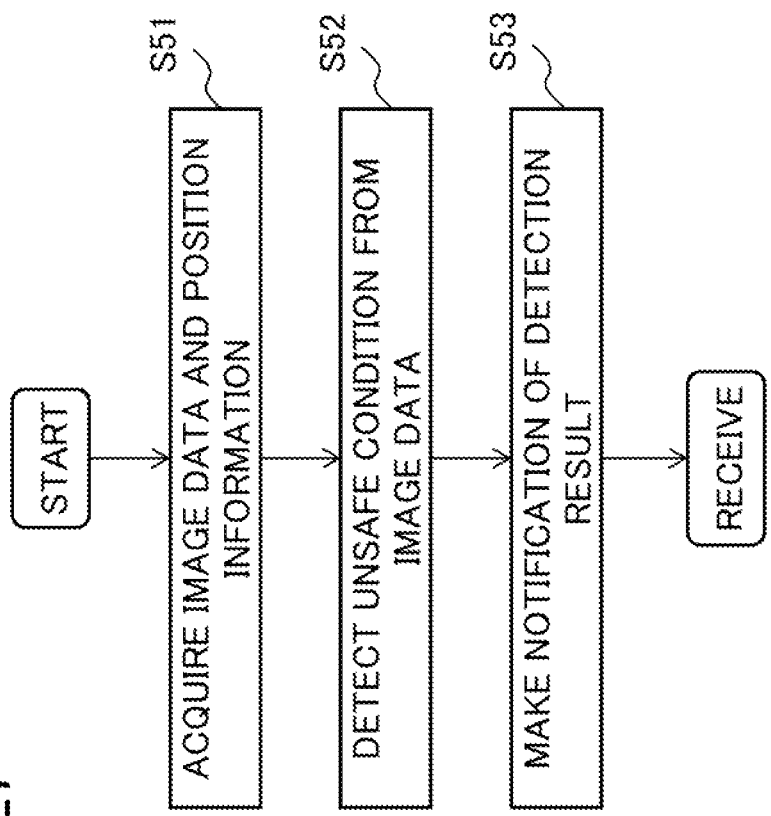
FIG. 27 is a diagram illustrating an example of an operation flow of a monitoring device according to the third example embodiment of the present invention.

A configuration of a third example embodiment of the present invention will be described. FIG. 26 is a diagram illustrating a configuration of a monitoring device 50 according to the present example embodiment. FIG. 27 is a diagram illustrating an operation flow of the monitoring device according to the present example embodiment. The monitoring device 50 of the present example embodiment includes an image data acquiring unit 51, a detecting unit 52, and a notifying unit 53. The image data acquiring unit 51 acquires image data obtained by imaging a work area, and information relating to the position at which the image data is captured. The detecting unit 52 detects, from the image data, at least either an unsafe behavior of a worker in the work area, or an unsafe environment around the worker, as an unsafe condition. Specifically, the unsafe behavior of the worker refers to a behavior having a high risk of occurrence of an accident, such as one-person work by a worker. The unsafe environment around the worker refers to an environment in which an accident may occur, such as a state in which the workers work densely. The notifying unit 53 notifies a terminal of the unsafe condition detected by the detecting unit 52, and the information relating to the position at which the unsafe condition is detected.

Next, an example of the operation of the monitoring device 50 will be described with reference to FIG. 27. The image data acquiring unit 51 acquires image data obtained by imaging a work area, and information relating to the position at which the image data is captured (step S51). Specifically, the image data acquiring unit 51 acquires, from the imaging device, image data captured by the imaging device installed in the work area. When the image data acquiring unit 51 acquires the image data, the detecting unit 52 detects at least one of the unsafe behavior of the worker in the work area and the unsafe environment around the worker from the image data as the unsafe condition (step S52). Specifically, the detecting unit 52 analyzes the image data, and detects the behavior of the worker or the surrounding environment as the unsafe condition when they are related to any of preset information (for example, reference data). When the detecting unit 52 detects the unsafe condition, information relating to the unsafe condition detected by the detecting unit 52 and information relating to the position at which the unsafe condition is detected are notified to the terminal (step S53).

The monitoring device 50 of the present example embodiment detects an unsafe behavior of the worker in the work area or an unsafe environment around the worker as an unsafe condition from image data obtained by imaging the work area, and notifies the terminal of information relating to the unsafe condition and information relating to the position. By notifying the terminal of the detection result in this manner, the administrator or the like who manages the work of the worker in the work area can obtain information relating to the position where the unsafe condition has occurred and what kind of unsafe condition has occurred through the terminal. Therefore, the monitoring device 50 of the present example embodiment can make notification of appropriate information necessary for safety management of the worker.

Figure 28:
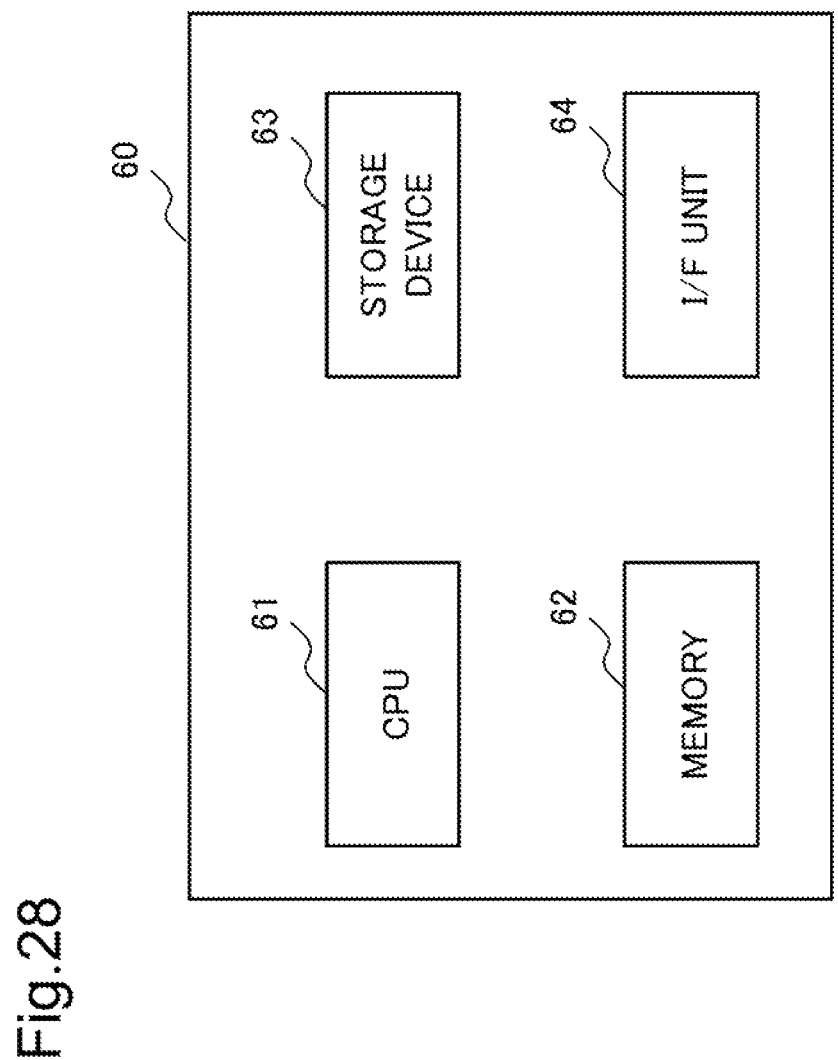
FIG. 28 is a view illustrating another configuration example of the example embodiment of the present invention.

Each processing in the monitoring device of the first to third example embodiments can be performed by a computer executing a computer program. FIG. 28 illustrates an example of a configuration of a computer 60 that executes a computer program for executing each processing in the learning device. The computer 60 includes a CPU 61, a memory 62, a storage device 63, and an interface (I/F) unit 64. The administrator terminals of the first example embodiment and the second example embodiment have similar configurations.

The CPU 61 reads and executes a computer program for executing each processing from the storage device 63. The arithmetic processing unit that executes the computer program may be configured by a combination of a CPU and a GPU instead of the CPU 61. The memory 62 includes a dynamic random access memory (DRAM) or the like, and temporarily stores a computer program executed by the CPU 61 and data being processed. The storage device 63 stores a computer program executed by the CPU 61. The storage device 63 includes, for example, a nonvolatile semiconductor storage device. The storage device 63 may include another storage device such as a hard disk drive. The I/F unit 64 is an interface that inputs and outputs data to and from an imaging device or another information processing device.

The computer program performed in each process can be stored in a recording medium and distributed. The recording medium may include, for example, a magnetic tape for data recording or a magnetic disk such as a hard disk. The recording medium may include an optical disk such as a compact disc read only memory (CD-ROM). A nonvolatile semiconductor storage device may be used as a recording medium.

In the first example embodiment and the second example embodiment, an example of the monitoring system in the construction site is described, but the monitoring system of each example embodiment can also be used for monitoring an unsafe condition in a place other than the construction site. For example, by monitoring the unsafe condition using the monitoring system of each example embodiment in a facility where people gather, such as a factory, a school, a stadium, a game hall, a commercial facility, or a transportation facility, it is possible to monitor the occurrence of the unsafe condition and take a safety measure based on the report.

The present invention is described above using the above-described example embodiments as exemplary examples. However, the present invention is not limited to the above-described example embodiments. That is, the present invention can have various aspects that can be understood by those skilled in the art within the scope of the present invention.

This application is based upon and claims the benefit of priority from Japanese patent application No. 2020-37532, filed on Mar. 5, 2020, the disclosure of which is incorporated herein in its entirety by reference.

REFERENCE SIGNS LIST 10 monitoring device
11 image data acquiring unit
12 detecting unit
13 notifying unit
14 report generating unit
15 storage unit
20 administrator terminal
30 imaging device
41 image data acquiring unit
42 image recognition unit
43 detecting unit
44 notifying unit
45 report generating unit
46 storage unit
50 monitoring device
51 image data acquiring unit
52 detecting unit
53 notifying unit
60 computer
61 CPU
62 memory
63 storage device
64 I/F unit

What is claimed is:

1. A monitoring device comprising:
at least one memory storing instructions; and
at least one processor configured to access the at least one memory and execute the instructions to:
acquire image data obtained by imaging a work area and information relating to a position at which the image data is captured;
identify, within the acquired image data, a worker scheduled to be in the work area, via face recognition using face data of the worker;
when the worker scheduled to be the work area is not identified within the acquired image data, identify, within the acquired image data, a person other than the worker and who has an entrance record or who is registered;
detect, within the image data, at least one of an unsafe behavior of the identified worker or person and an unsafe environment around the identified worker or person as an unsafe condition; and
notify a terminal of information relating to the detected unsafe condition, the identified worker or person, and information relating to a position at which the unsafe condition has been detected.

2. The monitoring device according to claim 1, wherein the at least one processor is further configured to execute the instructions to:
store the detected unsafe condition, the information relating to the position at which the unsafe condition has been detected, information relating to a date and time when the unsafe condition was detected, and the image data in association with each other in a storage;
calculate statistical data based on data stored in the storage; and
generate a report including the statistical data.

3. The monitoring device according to claim 1, wherein the at least one processor is further configured to execute the instructions to:
acquire the image data captured in each of a plurality of the work areas, and
notify the terminal of information relating to each work area in which the unsafe condition has been detected.

4. The monitoring device according to claim 1, wherein the at least one processor is further configured to execute the instructions to:
output an alarm via an alarm device in the work area when the unsafe condition has been detected.

5. A monitoring method performed by a computer and comprising:
acquiring image data obtained by imaging a work area and information relating to a position at which the image data is captured;
identifying, within the acquired image data, a worker scheduled to be in the work area, via face recognition using face data of the worker;
when the worker scheduled to be the work area is not identified within the acquired image data, identifying, within the acquired image data, a person other than the worker and who has an entrance record or who is registered;
detecting, within the image data, at least one of an unsafe behavior of the identified worker or person and an unsafe environment around the identified worker or person as an unsafe condition; and
notifying a terminal of information relating to the detected unsafe condition, the identified worker or person, and information relating to a position at which the unsafe condition has been detected.

6. The monitoring method according to claim 5, further comprising:
store the detected unsafe condition, the information relating to the position at which the unsafe condition has been detected, information relating to a date and time when the unsafe condition was detected, and the image data in association with each other in a storage;
calculating statistical data based on data stored in the storage; and
generating a report including the statistical data.

7. The monitoring method according to claim 5, further comprising:
acquiring the image data captured in each of a plurality of the work areas; and
notifying the terminal of information relating to each work area in which the unsafe condition has been detected.

8. A non-transitory recording medium storing instructions executable by a computer to perform processing comprising:
acquiring image data obtained by imaging a work area and information relating to a position at which the image data is captured;
identifying, within the acquired image data, a worker scheduled to be in the work area, via face recognition using face data of the worker;
when the worker scheduled to be the work area is not identified within the acquired image data, identifying, within the acquired image data, a person other than the worker and who has an entrance record or who is registered;
detecting, within the image data, at least one of an unsafe behavior of the identified worker or person and an unsafe environment around the identified worker or person as an unsafe condition; and
notifying a terminal of information relating to the detected unsafe condition, the identified worker or person, and information relating to a position at which the unsafe condition has been detected.

* * * * *